United States Patent
Takayama

(10) Patent No.: US 10,269,103 B2
(45) Date of Patent: Apr. 23, 2019

(54) IMAGE PROCESSING APPARATUS, IMAGE PROCESSING METHOD, AND IMAGE PROCESSING SYSTEM

(71) Applicant: CANON KABUSHIKI KAISHA, Tokyo (JP)

(72) Inventor: Tomohiko Takayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/301,794

(22) PCT Filed: Apr. 3, 2015

(86) PCT No.: PCT/JP2015/061181
§ 371 (c)(1),
(2) Date: Oct. 4, 2016

(87) PCT Pub. No.: WO2015/156378
PCT Pub. Date: Oct. 15, 2015

(65) Prior Publication Data
US 2017/0116715 A1 Apr. 27, 2017

(30) Foreign Application Priority Data
Apr. 10, 2014 (JP) .................................. 2014-081236

(51) Int. Cl.
*G06K 9/00* (2006.01)
*G06T 5/00* (2006.01)
(Continued)

(52) U.S. Cl.
CPC .............. *G06T 5/008* (2013.01); *G02B 21/14* (2013.01); *G02B 21/367* (2013.01); *G06T 5/50* (2013.01);
(Continued)

(58) Field of Classification Search
CPC ...... H04N 5/217; H04N 5/349; H04N 5/3415; H04N 5/3532; H04N 5/3572; H04N 5/232;
(Continued)

(56) References Cited

U.S. PATENT DOCUMENTS 7,444,014 B2 10/2008 Dresser et al.
8,605,144 B2 12/2013 Takayama
(Continued)

FOREIGN PATENT DOCUMENTS

JP 2000-162504 A 6/2000
JP 2006-518050 A 8/2006
(Continued)

OTHER PUBLICATIONS

International Search Report and Written Opinion issued in International Application No. PCT/JP2015/061181 dated Jul. 14, 2015.
(Continued)

*Primary Examiner* — Jose L Couso
(74) *Attorney, Agent, or Firm* — Venable LLP

(57) ABSTRACT

An image processing apparatus comprises a selection unit for selecting at least one pair of two layer image data items having focus positions shifted oppositely, by equal distances, in a positive direction and a negative direction relative to a reference depth in a specimen from among a plurality of layer image data items acquired with the focus positions set at different depths in the specimen and a phase contrast correction unit for performing, for each of the pair of the two layer image data items selected by the selection unit, a correction process which reduces a difference in phase contrast component between the two layer image data items.

18 Claims, 24 Drawing Sheets

(51) Int. Cl.
*G02B 21/14* (2006.01)
*G02B 21/36* (2006.01)
*H04N 5/232* (2006.01)
*G06T 5/50* (2006.01)

(52) U.S. Cl.
CPC ..... *H04N 5/23212* (2013.01); *H04N 5/23293* (2013.01); *G06T 2207/10024* (2013.01); *G06T 2207/10028* (2013.01); *G06T 2207/10056* (2013.01); *G06T 2207/10148* (2013.01); *G06T 2207/20024* (2013.01); *G06T 2207/20216* (2013.01); *G06T 2207/30024* (2013.01)

(58) Field of Classification Search
CPC ............... H04N 5/225; H04N 5/23293; H04N 5/23212; H04N 5/23232; H04N 5/3696; H04N 13/0018; H04N 13/0022; H04N 2201/0084; G02B 21/367; G02B 21/14; G02B 21/241; G02B 21/365; G02B 7/36; G02B 7/28; G02B 7/38; G02B 7/346; G03B 13/36; G03B 3/10; G03B 13/34; G03F 1/36; G03F 1/26; G03F 9/7026; G01B 11/02; G01B 9/02063; G06F 19/321; G06T 3/40; G06T 3/4038; G06T 5/003; G06T 5/008; G06T 5/50; G06T 7/50; G06T 7/571; G06T 7/80; G06T 11/60; G06T 2200/04; G06T 2207/10056; G06T 2207/10064; G06T 2207/10148; G06K 9/00134; G06K 2209/40
See application file for complete search history.

(56) References Cited

U.S. PATENT DOCUMENTS

| | | | |
|---|---|---|---|
| 9,041,791 B2* | 5/2015 | Zahniser | H04N 5/23212 348/79 |
| 9,207,444 B2* | 12/2015 | Yamamoto | G02B 7/28 |
| 2004/0228520 A1 | 11/2004 | Dresser et al. | |
| 2012/0147224 A1 | 6/2012 | Takayama | |
| 2012/0147232 A1 | 6/2012 | Takayama et al. | |
| 2013/0100272 A1* | 4/2013 | Price | G02B 7/38 348/79 |
| 2013/0162800 A1* | 6/2013 | Kim | G02B 21/14 348/79 |
| 2014/0184778 A1 | 7/2014 | Takayama | |
| 2015/0087902 A1* | 3/2015 | Mertz | G02B 21/14 600/109 |
| 2015/0100278 A1* | 4/2015 | Gaylord | G01N 21/41 702/189 |
| 2016/0299330 A1* | 10/2016 | Aisaka | G02B 21/16 |

FOREIGN PATENT DOCUMENTS

| | | |
|---|---|---|
| JP | 2008-102294 A | 5/2008 |
| JP | 2010-191000 A | 9/2010 |
| JP | 2011-118107 A | 6/2011 |
| JP | 2012-008254 A | 1/2012 |

OTHER PUBLICATIONS

Notification Concerning Transmittal of International Preliminary Report on Patentability and Written Opinion of he International Search Authority issued in counterpart International Patent Application No. PCT/JP20151061181, dated Oct. 20, 2016.

* cited by examiner

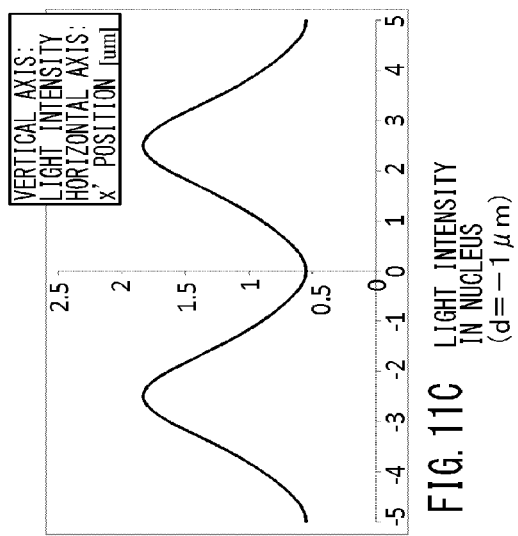
FIG. 11A  LIGHT INTENSITY IN NUCLEUS (d=+1μm)
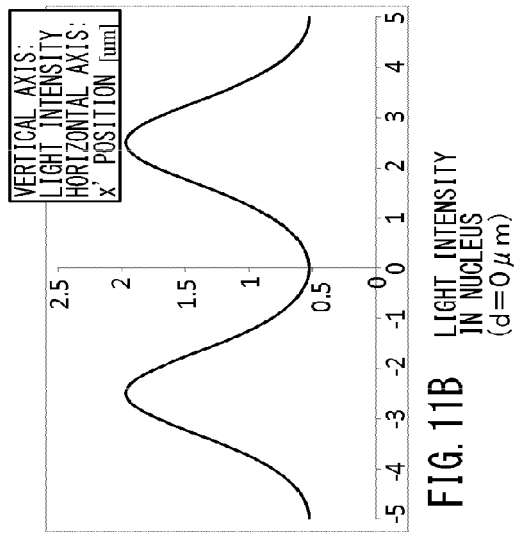
FIG. 11B  LIGHT INTENSITY IN NUCLEUS (d=0μm)
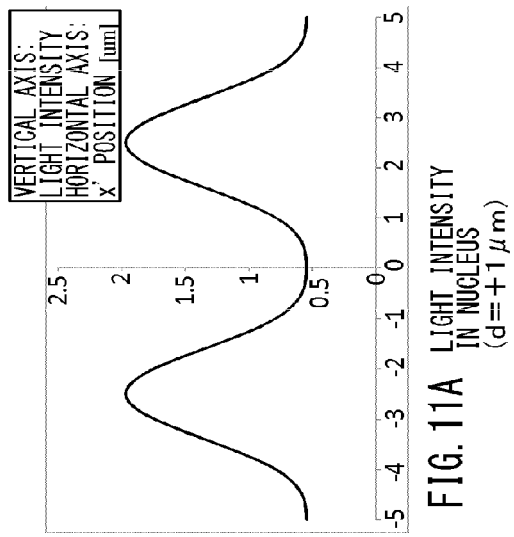
FIG. 11C  LIGHT INTENSITY IN NUCLEUS (d=−1μm)
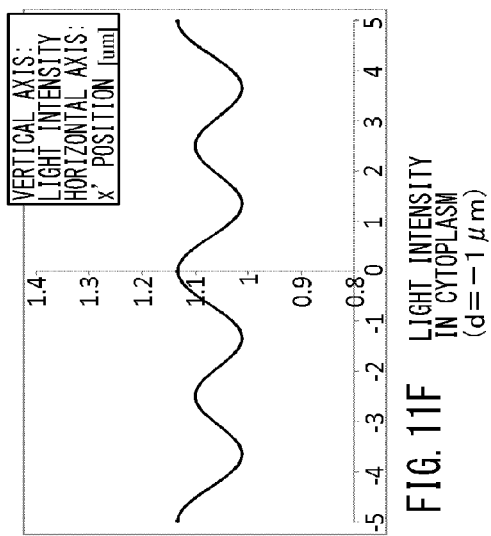
FIG. 11D  LIGHT INTENSITY IN CYTOPLASM (d=+1μm)
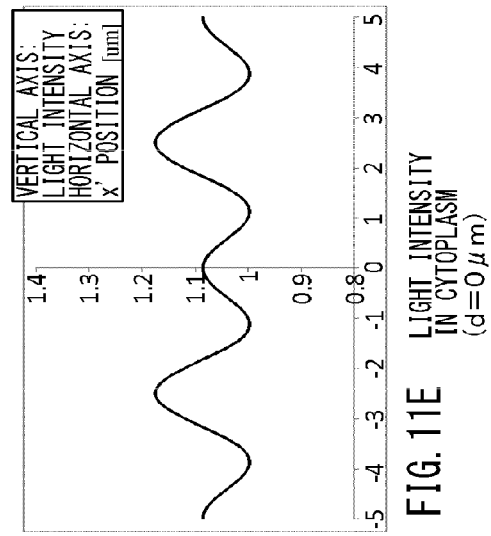
FIG. 11E  LIGHT INTENSITY IN CYTOPLASM (d=0μm)
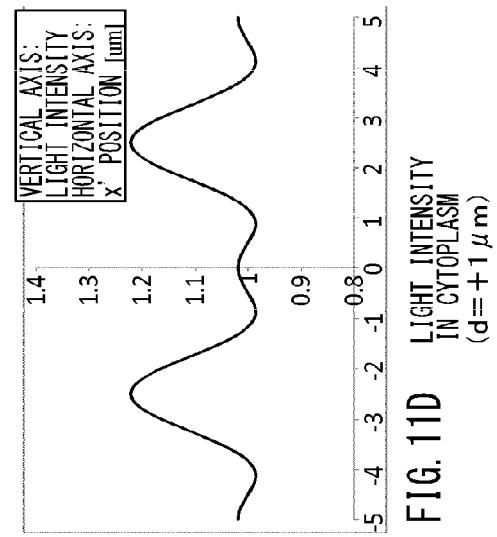
FIG. 11F  LIGHT INTENSITY IN CYTOPLASM (d=−1μm)

LIGHT INTENSITY IN CYTOPLASM
(UPPER PART: d=+1μm,
MIDDLE PART: d=0μm,
LOWER PART: d=−1μm)

EXAMPLE OF EXCESSIVE CONTRAST
ENHANCEMENT IN FOCUS STACKING

LIGHT INTENSITY IN NUCLEUS AFTER PHASE CONTRAST REDUCTION PROCESS
(UPPER PART: d=±1 μm, LOWER PART: d=0 μm)

LIGHT INTENSITY IN CYTOPLASM AFTER PHASE CONTRAST REDUCTION PROCESS
(UPPER PART: d=±1 μm, LOWER PART: d=0 μm)

LIGHT INTENSITY IN CYTOPLASM AFTER SECOND PHASE CONTRAST INVERSION PROCESS
(UPPER PART: d=±1μm, LOWER PART: d=0μm)

LIGHT INTENSITY IN CYTOPLASM AFTER FIRST PHASE CONTRAST INVERSION PROCESS
(UPPER PART: d=±1μm, LOWER PART: d=0μm)

LIGHT INTENSITY IN CYTOPLASM (UPPER PART: d=+1μm, MIDDLE PART: d=0μm, LOWER PART: d=−1μm)

LIGHT INTENSITY IN CYTOPLASM AFTER PHASE CONTRAST REDUCTION PROCESS
(UPPER PART: $d=\pm 1\,\mu m$, LOWER PART: $d=0\,\mu m$)

LIGHT INTENSITY IN CYTOPLASM AFTER FIRST PHASE CONTRAST INVERSION PROCESS
(UPPER PART: $d=\pm 1\,\mu m$, LOWER PART: $d=0\,\mu m$)

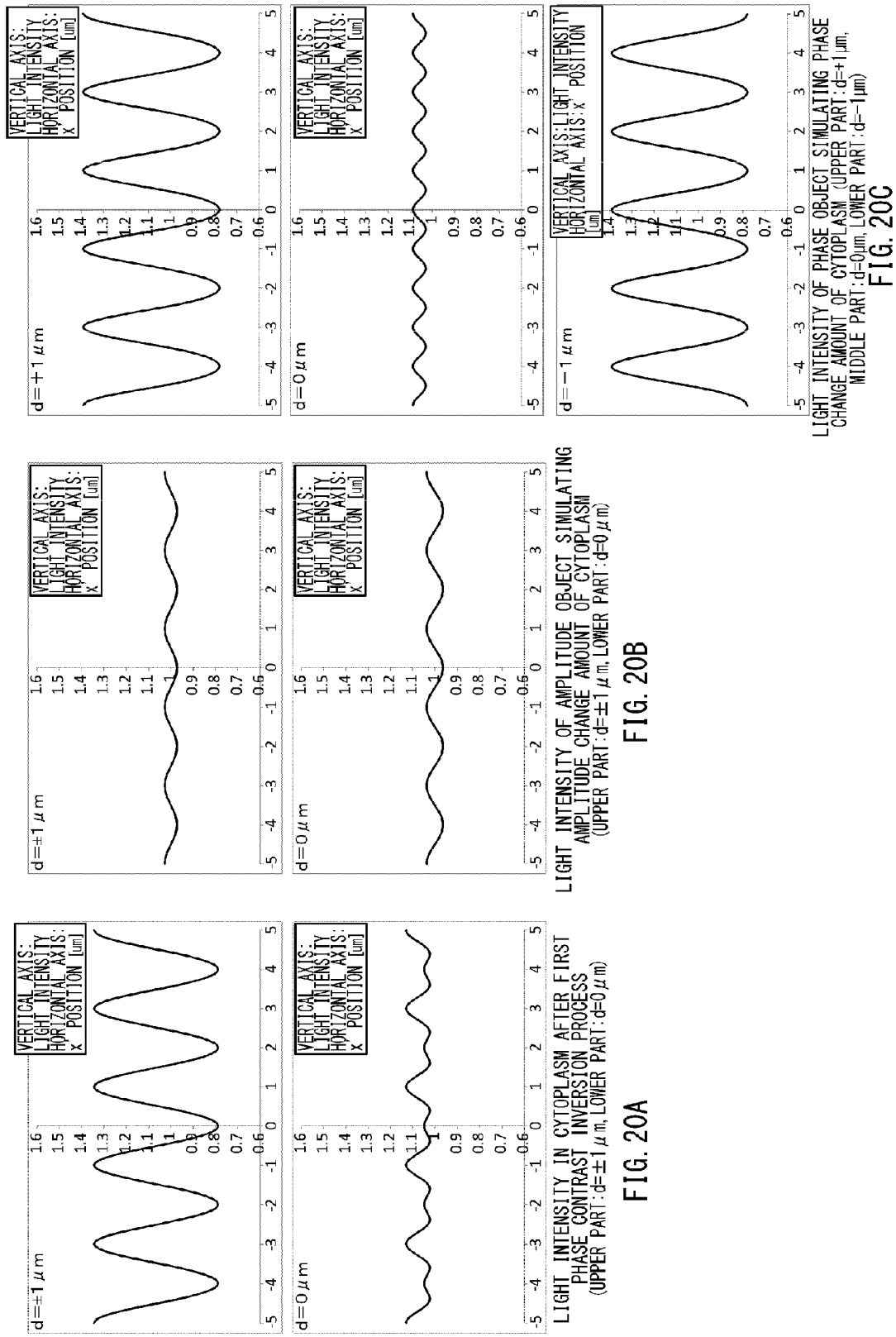

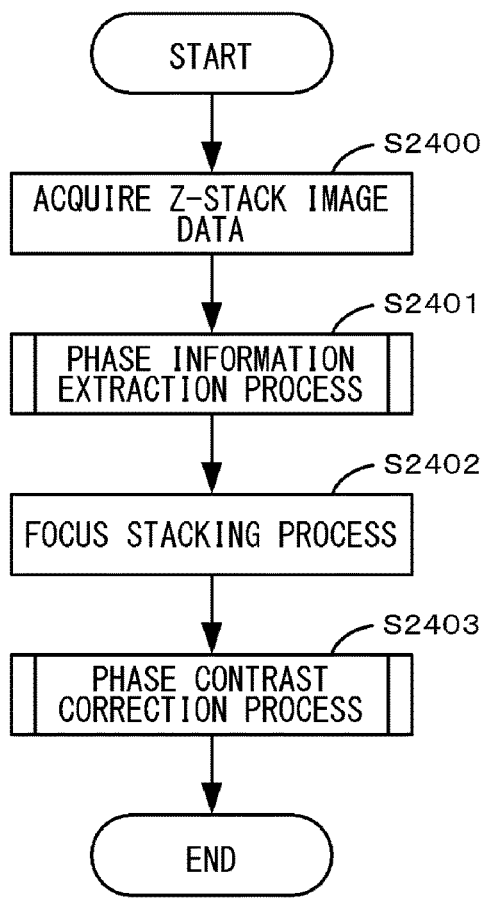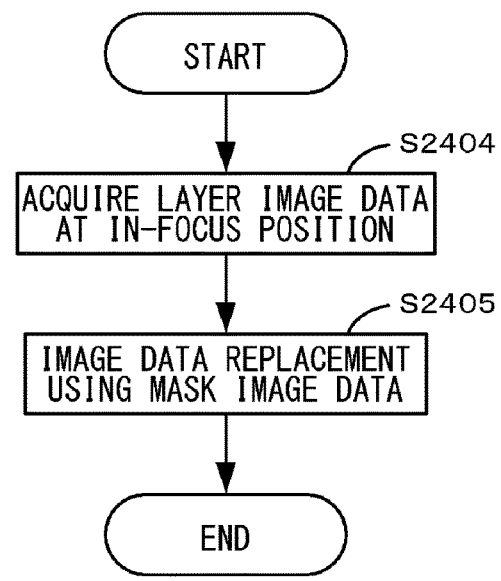
FIG. 24A
FIG. 24B

IMAGE PROCESSING APPARATUS, IMAGE PROCESSING METHOD, AND IMAGE PROCESSING SYSTEM

TECHNICAL FIELD

The present invention relates to an image processing apparatus, an image processing method, and an image processing system.

BACKGROUND ART

Attention is focused on a virtual slide system capable of acquiring virtual slide image data by imaging a stained biological sample on a slide (also referred to as a preparation) using a digital microscope, and observing the virtual slide image data displayed on a monitor (Patent Literature 1).

In addition, there is known a technique for acquiring a plurality of layer image data items focused on different depths in a sample while changing a focus position in an optical axis direction by using a digital microscope in the case where a thick biological sample is imaged (Patent Literature 2). Three-dimensional image data constituted by the plurality of layer image data items is referred to as Z-stack image data.

Further, there is also known a technique for extracting focal point areas which are in focus from a plurality of layer image data items, and combining the focal point areas to thereby generate two-dimensional focus stacking image data which is focused on all of the areas (Patent Literature 3).

In addition, there is also known a technique for reproducing a phase distribution image by using two successive images in the vicinity of an in-focus position of an optical system (Patent Literature 4).

CITATION LIST

Patent Literature

Patent Literature 1: Japanese Patent Application Laid-open No. 2011-118107
Patent Literature 2: Japanese Patent Application Laid-open No. 2010-191000
Patent Literature 3: Japanese Patent Application Laid-open No. 2000-162504
Patent Literature 4: Japanese Patent Application Laid-open No. 2008-102294

SUMMARY OF INVENTION

Technical Problem

The biological sample includes a plurality of types of constituent elements such as a nucleus, cytoplasm, and a membrane, and different constituent elements have different refractive indexes of light. Accordingly, the plurality of layer image data items acquired by the technique disclosed in Patent Literature 2 include two types of the layer image data items influenced by a phase contrast. The phase contrast denotes a phenomenon in which a phase shift is generated by refraction when light passes through an object and the phase shift manifests itself as the contrast of an image. The two types of the layer image data items include the layer image data item influenced by a positive contrast (dark contrast) and the layer image data item influenced by a negative contrast (bright contrast). When the plurality of layer image data items are successively displayed on a display device and are observed in order to grasp the three-dimensional structure of the biological sample, there is a possibility that brightness change of the layer image data item caused by the phase contrast is recognized as an artifact.

In addition, in the focus stacking image data generation technique disclosed in Patent Literature 3, with the influence of the layer image data items having different phase contrasts, there is a possibility that the focus stacking image data in which the contrast is excessively enhanced is generated.

With a phase information visualization technique disclosed in Patent Literature 4, it is possible to visualize phase information on a colorless transparent biological sample which is not stained in a range in which weak phase approximation can be used. However, Patent Literature 4 does not disclose a technique for generating a plurality of layer image data items in which the phase contrast is reduced for a stained biological sample.

To cope with this, an object of the present invention is to provide a technique for generating image data in which the artifact caused by the phase contrast is reduced.

Solution to Problem

A first aspect of the present invention resides in an image processing apparatus comprising: a selection unit for selecting at least one pair of two layer image data items having focus positions shifted oppositely, by equal distances, in a positive direction and a negative direction relative to a reference depth in a specimen from among a plurality of layer image data items acquired with the focus positions set at different depths in the specimen; and a phase contrast correction unit for performing, for each of the pair of the two layer image data items selected by the selection unit, a correction process which reduces a difference in phase contrast component between the two layer image data items.

A second aspect of the present invention resides in an image processing apparatus comprising: a focus stacking unit for generating a focus stacking image data item by performing focus stacking on a plurality of layer image data items acquired with focus positions set at different depths in a specimen; an acquisition unit for acquiring one representative layer image data item from the plurality of layer image data items; and a phase contrast correction unit for dividing the focus stacking image data item into a phase object area and an area other than the phase object area, and correcting data in the phase object area by using the representative layer image data item.

A third aspect of the present invention resides in an image processing system comprising: an imaging device which acquires a plurality of layer image data items by capturing images with focus positions set at different depths in a specimen; and the image processing apparatus according to the present invention which processes the plurality of layer image data items acquired by the imaging device.

A fourth aspect of the present invention resides in an image processing method comprising the steps of: causing a computer to select at least one pair of two layer image data items having focus positions shifted oppositely, by equal distances, in a positive direction and a negative direction relative to a reference depth in a specimen from among a plurality of layer image data items acquired with the focus positions set at different depths in the specimen; and causing the computer to perform, for each of the selected pair of the two layer image data items, a correction process which reduces a difference in phase contrast component between the two layer image data items.

A fifth aspect of the present invention resides in an image processing method comprising the steps of: causing a computer to generate a focus stacking image data item by performing focus stacking on a plurality of layer image data items acquired with focus positions set at different depths in a specimen; causing the computer to acquire one representative layer image data item from the plurality of layer image data items; and causing the computer to divide the focus stacking image data item into a phase object area and an area other than the phase object area and correct data in the phase object area by using the representative layer image data item.

A sixth aspect of the present invention resides in a program that causes a computer to execute the respective steps of the image processing method according to the present invention.

Advantageous Effects of Invention

According to the present invention, it is possible to generate the image data in which the artifact caused by the phase contrast is reduced.

Further features of the present invention will become apparent from the following description of exemplary embodiments with reference to the attached drawings.

BRIEF DESCRIPTION OF DRAWINGS

FIGS. 11A to 11F are schematic views for explaining contrast change of the stained specimen;

FIGS. 20A to 20C are schematic views for explaining the effect of the phase contrast inversion process of the first embodiment;

FIGS. 24A and 24B are flowcharts of the two-dimensional focus stacking image data generation process of a fourth embodiment.

DESCRIPTION OF EMBODIMENTS

Figure 1:
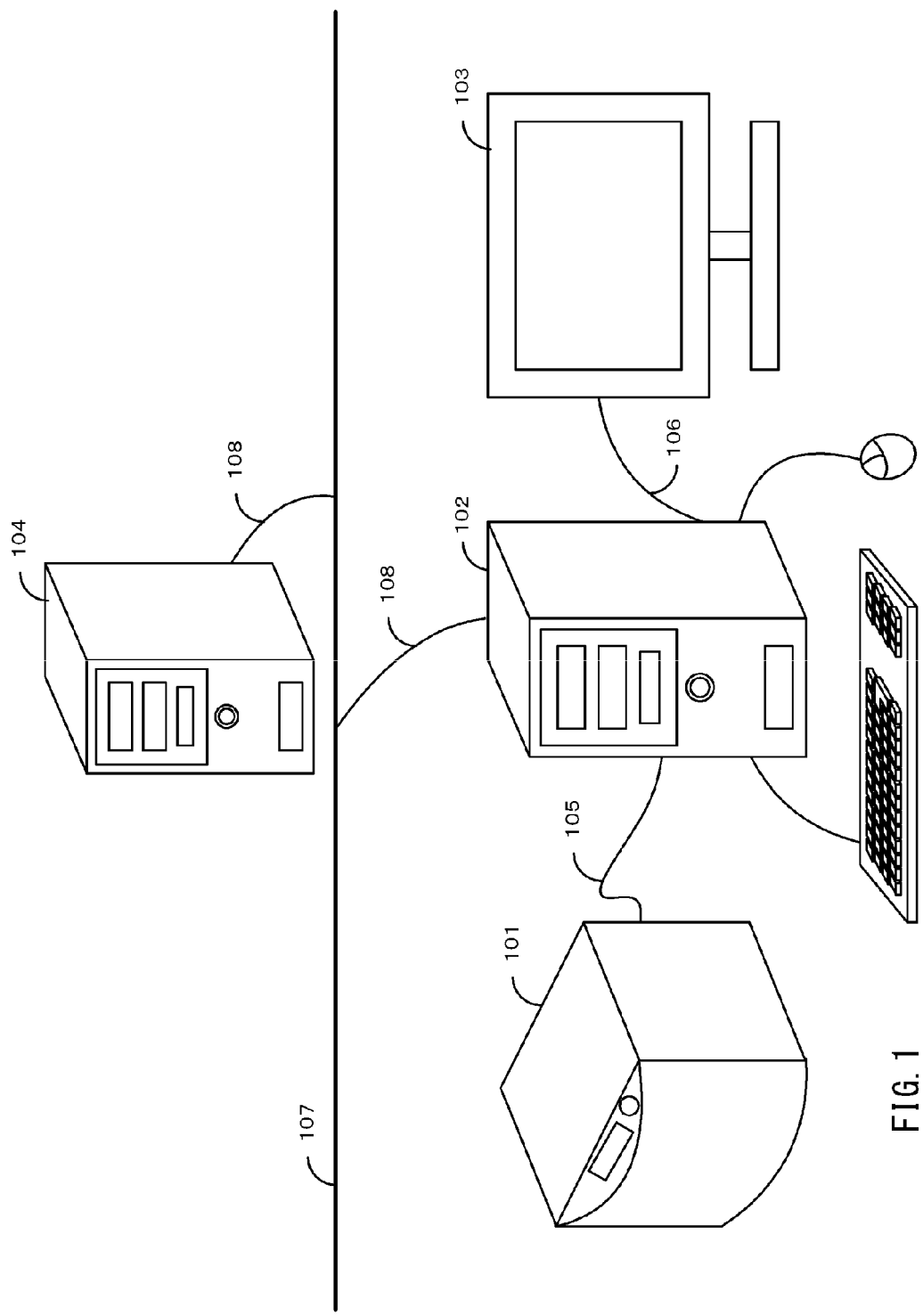
FIG. 1 is an overall view of a device configuration of an image processing system.

Hereinbelow, embodiments of the present invention will be described with reference to the drawings.

First Embodiment (Apparatus Configuration of Image Processing System)

An image processing apparatus according to the embodiments of the present invention can be used in an image processing system which includes an imaging device and a display device. The configuration of the image processing system will be described by using FIG. 1. The image processing system is a system which includes an imaging device (a digital microscope device or a virtual slide scanner) 101, an image processing apparatus 102, a display device 103, and a data server 104, and has the function of acquiring and displaying a two-dimensional image of a specimen serving as an imaging target. The imaging device 101 and the image processing apparatus 102 are connected to each other using a dedicated or general-purpose I/F cable 105, and the image processing apparatus 102 and the display device 103 are connected to each other using a general-purpose I/F cable 106. The data server 104 and the image processing apparatus 102 are connected to each other using a general-purpose I/F LAN cable 108 via a network 107.

The imaging device 101 is the virtual slide scanner which has the function of acquiring a plurality of two-dimensional image data items and outputting a digital image. In the imaging device 101, the entire specimen is divided into a plurality of areas (also referred to as tiles or blocks), and a plurality of two-dimensional image data items (layer image data items) having different focus positions in an optical axis direction (a depth direction of the specimen; a Z direction) are acquired in each of the areas. Solid state image sensors such as a CCD (Charge Coupled Device) and a CMOS (Complementary Metal Oxide Semiconductor) are used for the acquisition of the two-dimensional image data items. Note that the imaging device 101 can also be constituted by the digital microscope device in which a digital camera is mounted to the eyepiece of a normal microscope instead of the virtual slide scanner.

The image processing apparatus 102 is a device which has the function of generating data to be displayed on the display device 103 from a plurality of original image data items (layer image data items) acquired from the imaging device 101 in accordance with the request of a user. The image processing apparatus 102 is constituted by a general-purpose computer or a work station which includes hardware resources such as a CPU (Central Processing Unit), a RAM, a storage device, an operation section, and various I/Fs. The storage device is a large-capacity information storage device such as a hard disk drive or the like, and stores a program, data, and an OS (Operating System) for implementing individual processes described later. The CPU loads required programs and data from the storage device into the RAM and executes them, and individual functions described later are thereby implemented. The operation section is constituted by a keyboard and a mouse, and is used by the user for inputting various instructions.

The display device 103 is a display which displays image data for observation as the result of arithmetic processing by the image processing apparatus 102, and is constituted by a liquid crystal display or the like.

The data server 104 is a server in which the image data for observation as the result of the arithmetic processing by the image processing apparatus 102 is stored.

In an example in FIG. 1, the image processing system is constituted by the imaging device 101, the image processing apparatus 102, the display device 103, and the data server 104, but the configuration of the present invention is not limited to this configuration. For example, the image processing apparatus which is integrated with the display device may be used, or the function of the image processing apparatus may be incorporated into the imaging device. In addition, the functions of the imaging device, the image processing apparatus, the display device, and the data server can be implemented by one device. Further, conversely, the function of the image processing apparatus or the like may be divided and implemented by a plurality of devices.

(Display Screen)

Figure 2:
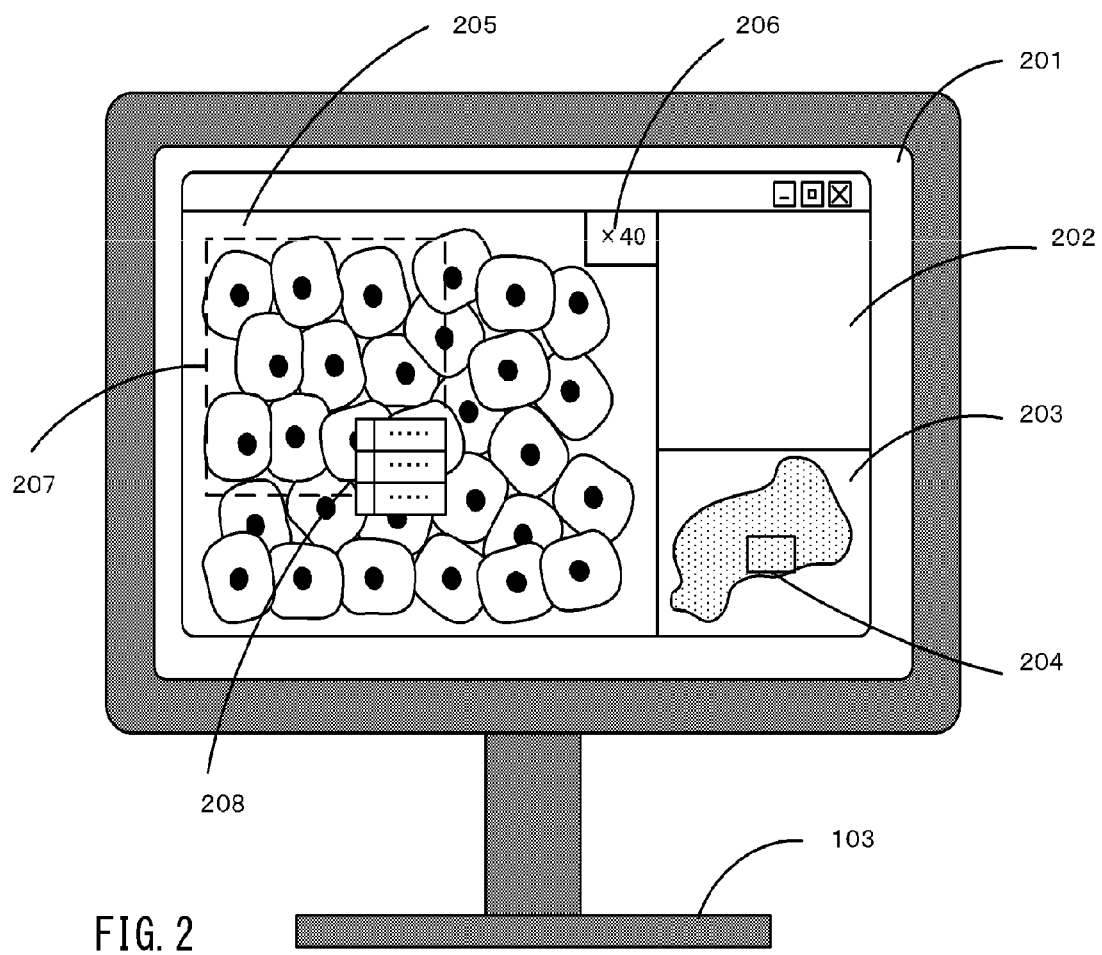
FIG. 2 shows an example of display of an image display application.

FIG. 2 is an example of the case where image data on a pre-imaged stained specimen (biological sample) is displayed on the display device 103 through an image display application.

FIG. 2 shows the basic configuration of the screen layout of the image display application. In the entire window 201 of the display screen, an information area 202 which displays statuses of the display and operations and information on various images, an entire image 203 of the specimen to be observed, a display area 205 for detail observation of specimen image data, and a display magnification 206 of the display area 205 are disposed. A frame line 204 drawn on the entire image 203 indicates the position and the size of the area which is magnified and displayed in the display area 205 for the detail observation. With the entire image 203 and the frame line 204, a user can easily grasp the portion of the entire specimen image data which is observed.

The image data displayed in the display area 205 for the detail observation is updated in response to a movement instruction and a magnification/reduction instruction through an input operation device. For example, the movement can be implemented by dragging of the mouse on the screen, and the magnification/reduction can be implemented by rotation of a mouse wheel (e.g., forward rotation of the wheel is allocated to the magnification, and rearward rotation thereof is allocated to the reduction) or the like. In addition, switching to image data having a different focus position can be implemented by rotating the mouse wheel while pressing down a predetermined key (e.g., a Ctrl key) (e.g., the forward rotation of the wheel is allocated to the movement to an image having a greater depth, and the rearward rotation thereof is allocated to the movement to an image having a lesser depth). In response to the operation for changing the image data by the user described above, the display area 205, the display magnification 206, and the frame line 204 in the entire image 203 are updated. Thus, the user can observe the image data having a desired in-plane position, depth position, and magnification.

It is also possible to cause the display area 205 for the detail observation to display image data having been subjected to image processing such as a focus stacking process or the like. For example, after an area 207 in the display image displayed by the image display application is selected using the mouse, the item of the "focus stacking process" (not shown) is selected from a function expansion menu 208 displayed by the right click of the mouse. Correspondingly to this, image data after the focus stacking process is displayed in the area 207. In addition, it is also possible to cause not the display area 205 for the detail observation but a new window (not shown) to display the image data after the focus stacking process.

(Functional Configuration of Imaging Device)

Figure 3:
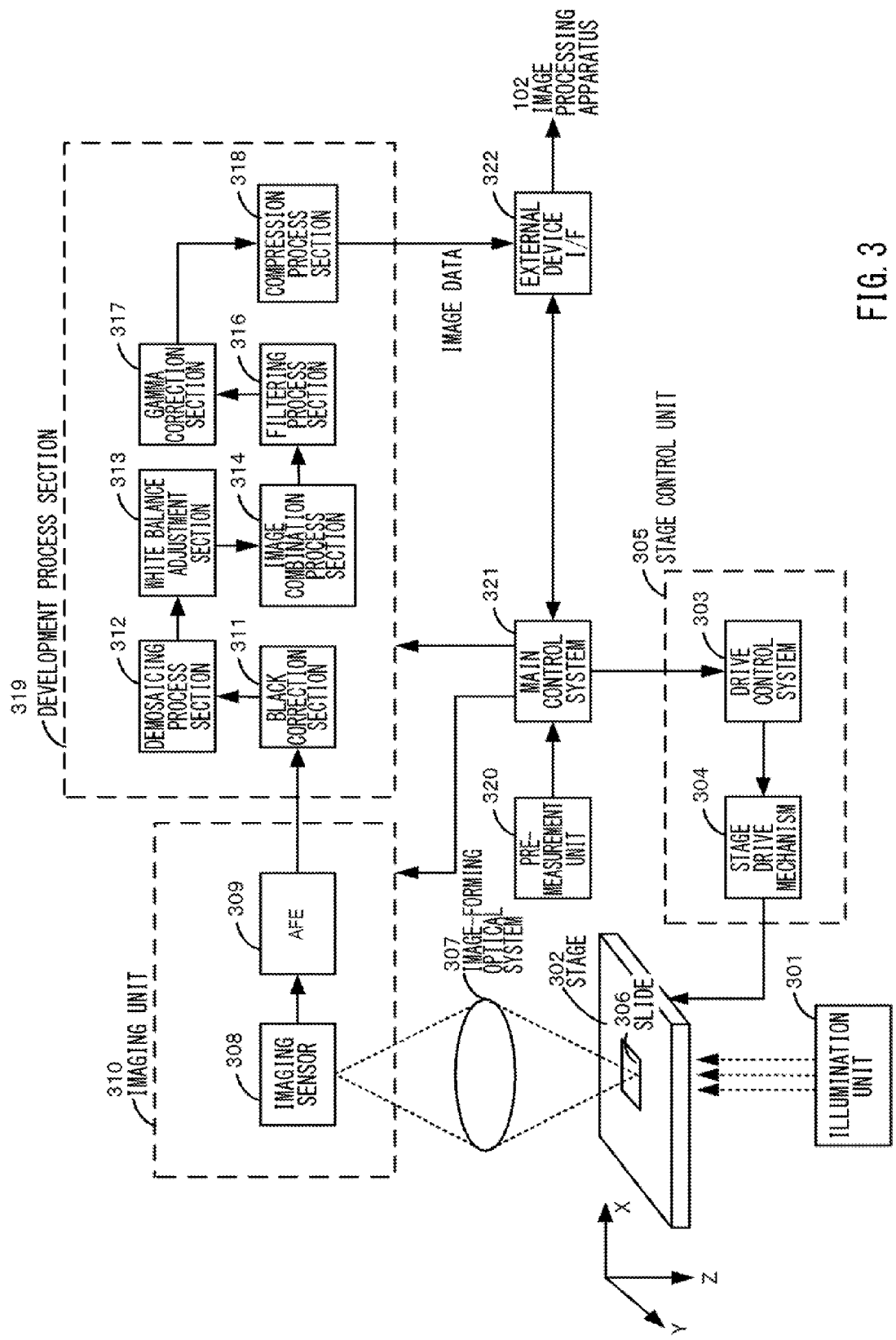
FIG. 3 is a functional block diagram of an imaging device in the image processing system.

FIG. 3 is a block diagram showing the functional configuration of the imaging device 101. The imaging device 101 generally has an illumination unit 301, a stage 302, a stage control unit 305, an image-forming optical system 307, an imaging unit 310, a development process unit 319, a pre-measurement unit 320, a main control system 321, and an external device I/F 322.

The illumination unit 301 is means for uniformly emitting light to the slide 306 disposed on the stage 302, and is constituted by a light source, an illumination optical system, and a control system for light source drive. The drive of the stage 302 is controlled by the stage control unit 305, and the stage 302 can move in three-axis directions of X, Y, and Z. The slide 306 is a member having a slice of a tissue to be observed affixed onto a slide glass which is fixed below a cover glass together with an encapsulant.

The stage control unit 305 has a drive control system 303 and a stage drive mechanism 304. The drive control system 303 receives the instruction of the main control system 321, and performs drive control of the stage 302. The movement direction and the movement amount of the stage 302 are determined based on position information and thickness information (distance information) on the specimen measured by the pre-measurement unit 320 and the instruction from the user on an as needed basis. The stage drive mechanism 304 drives the stage 302 in accordance with the instruction of the drive control system 303.

The image-forming optical system 307 is a group of lenses for forming the optical image of the specimen of the slide 306 in an imaging sensor 308.

The imaging unit 310 has the imaging sensor 308 and an analog front end (AFE) 309. The imaging sensor 308 is a one-dimensional or two-dimensional image sensor which converts a two-dimensional optical image into an electrical physical quantity by photoelectric conversion and, e.g., a CCD or a CMOS device is used as the imaging sensor 308. In the case of the one-dimensional sensor, the two-dimensional image can be obtained by performing electrical scanning in a scanning direction and moving the stage 302 in a sub-scanning direction. An electrical signal having a voltage value corresponding to the intensity of light is outputted from the imaging sensor 308. In the case where color image data is desired, a single-plate image sensor to which a Bayer pattern color filter is attached or an RGB three-plate image sensor may be used appropriately. The imaging unit 310 acquires divided image data on the specimen by driving the stage 302 in X and Y directions.

The AFE 309 is a circuit which controls the operation of the imaging sensor 308, and is also a circuit which converts an analog signal outputted from the imaging sensor 308 to a digital signal. The AFE 309 is constituted by an H/V driver, a CDS (Correlated Double Sampling), an amplifier, an AD converter, and a timing generator. The H/V driver converts potentials of a vertical synchronization signal and a horizontal synchronization signal for driving the imaging sensor 308 to potentials required to drive the sensor. The CDS is a correlated double sampling circuit which removes noises of a fixed pattern. The amplifier is an analog amplifier which adjusts the gain of the analog signal from which the noise is removed in the CDS. The AD converter converts the analog signal to the digital signal. In the case where the output in the final stage of the imaging device is an 8-bit output, the AD converter converts the analog signal to digital data which is quantized to about 10-bit data to 16-bit data in consideration of a process in a subsequent stage, and outputs the digital data. The converted sensor output data is referred to as RAW data. The RAW data is subjected to a development process in the development process unit 319 in a subsequent stage. The timing generator generates a signal for adjusting the timing of the imaging sensor 308 and the timing of the development process unit 319 in the subsequent stage. In the case where the CCD is used as the imaging sensor 308, the above-described AFE 309 is essential. However, in the case of the CMOS image sensor capable of digital outputting, the function of the AFE 309 is implemented in the sensor.

The development process unit 319 has a black correction section 311, a demosaicing process section 312, a white balance adjustment section 313, an image combination process section 314, a filtering process section 316, a gamma correction section 317, and a compression process section 318. The black correction section 311 performs a process which subtracts a background (black correction data obtained when light is blocked) from the values of individual pixels of the RAW data. The demosaicing process section 312 performs a process which generates image data items of RGB colors from the RAW data having the Bayer pattern. The demosaicing process section 312 calculates values of the RGB colors of a target pixel by interpolating values of peripheral pixels (including pixels having the same color and different colors) in the RAW data. In addition, the demosaicing process section 312 also executes a correction process (interpolation process) of a defective pixel. Note that, in the case where the imaging sensor 308 does not have a color filter and single-color image data is obtained, the demosaicing process becomes unnecessary and the correction process of the defective pixel is executed. In the case where the three-plate imaging sensor 308 is used as well, the demosaicing process is not necessary. The white balance adjustment section 313 performs a process for reproducing a desired white color by adjusting the gains of the individual RGB colors in accordance with the color temperature of light of the illumination unit 301.

The image combination process section 314 performs a process in which large-size image data having a desired imaging range is generated by stitching a plurality of divided image data items which are imaged by the imaging sensor 308 together after a division operation. In general, the presence range of the specimen is wider than the imaging range acquired by one imaging by an existing image sensor, and hence one two-dimensional image data item is generated by stitching the plurality of divided image data items together. For example, in the case where it is assumed that the range of 10 mm×10 mm on the slide 306 is imaged with a resolution of 0.25 μm, the number of pixels of one side is 40000 as 10 mm/0.25 μm, and the total number of pixels is 1.6 billions which is the square of 40000. In order to acquire image data having 1.6 billion pixels by using the imaging sensor 308 having the number of pixels of 10 M (10000000), it is necessary to divide the entire area into 160 areas as 1.6 billion/10 M and image the areas. Note that, examples of a method for stitching a plurality of image data items together include a method in which the plurality of image data items are stitched together by performing positioning based on position information of the stage 302, and a method in which the plurality of image data items are stitched together by associating points or lines of a plurality of divided image items with each other. When the stitching is performed, it is possible to smoothly perform the stitching by performing interpolation processes such as 0-order interpolation, linear interpolation, and high-order interpolation.

The filtering process section 316 is a digital filter which implements suppression, noise removal, and resolution sense enhancement of a high frequency component included in an image. The gamma correction section 317 executes a process for adding the inverse of gradation expression characteristics of a typical display device to an image, and also executes gradation conversion corresponding to visual characteristics of a human being by gradation compression or dark portion processing of a high brightness part. In the present embodiment, for image acquisition for the purpose of form observation, the gradation conversion suitable for the combination process and the display process in subsequent stages is applied to the image data. The compression process section 318 executes a coding process of compression performed in order to increase efficiency of transmission of large-capacity two-dimensional image data and reduce volume when the two-dimensional image data is stored. As a compression method of a static image, standardized coding methods such as JPEG (Joint Photographic Experts Group), and JPEG 2000 and JPEG XR obtained by improving and developing JPEG are widely known.

The pre-measurement unit 320 is a unit which performs pre-measurement for calculating position information on the specimen on the slide 306, information on a distance to a desired focus position, and a parameter for light amount adjustment resulting from the thickness of the specimen. By acquiring the information using the pre-measurement unit 320 before main measurement (acquisition of imaged image data), it becomes possible to execute efficient imaging. For the acquisition of the position information on a two-dimensional plane, a two-dimensional imaging sensor having a resolution lower than that of the imaging sensor 308 is used. The pre-measurement unit 320 grasps the position of the specimen on an XY plane from acquired image data. For the acquisition of the distance information and the thickness information, measurement equipment such as a laser displacement meter or the like is used.

The main control system 321 has the function of performing control of various units described thus far. The control functions of the main control system 321 and the development process unit 319 are implemented by a control circuit having a CPU, a ROM, and a RAM. That is, the program and the data are stored in the ROM, and the CPU executes the program by using the RAM as a work memory and the functions of the main control system 321 and the development process unit 319 are thereby implemented. As the ROM, devices such as, e.g., an EEPROM and a flash memory are used and, as the RAM, DRAM devices such as, e.g., a DDR3 and the like are used. Note that the function of the development process unit 319 may be replaced with an element which is made into an ASIC as a dedicated hardware device.

The external device I/F 322 is an interface for sending image data generated by the development process unit 319 to the image processing apparatus 102. The imaging device 101 and the image processing apparatus 102 are connected to each other using an optical communication cable. Alternatively, a general-purpose interface such as a USB or Gigabit Ethernet (registered trademark) is used.

(Hardware Configuration of Image Processing Apparatus)

Figure 4:
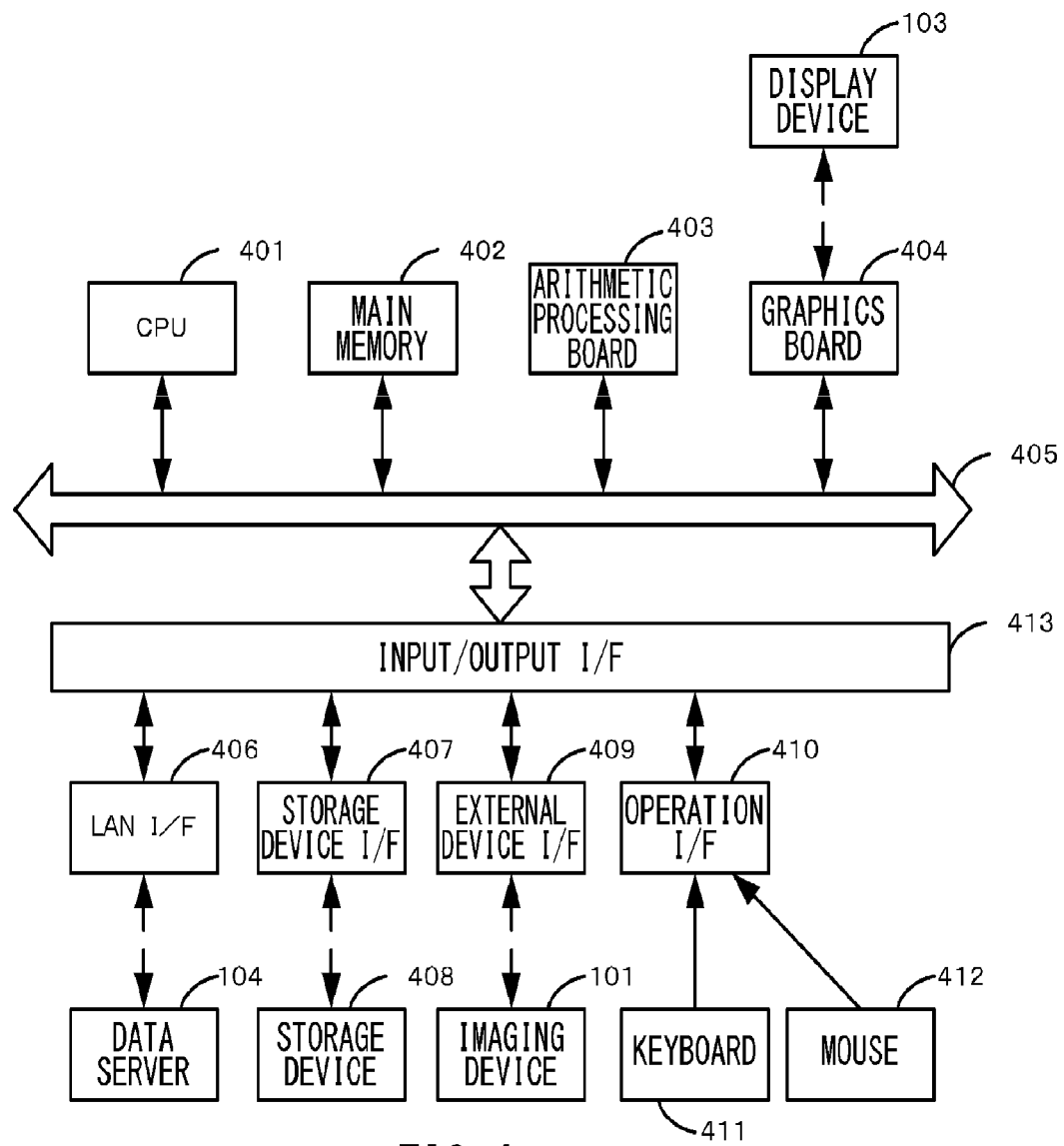
FIG. 4 is a hardware configuration diagram of an image processing apparatus.

FIG. 4 is a block diagram showing the hardware configuration of the image processing apparatus 102. As a apparatus for performing image processing, for example, a PC (Personal Computer) is used. The PC includes a CPU 401, a main memory 402, an arithmetic processing board 403, a graphics board 404, and an internal bus 405 which connects these elements to each other. In addition, the PC includes a LAN I/F 406, a storage device I/F 407, an external device I/F 409, an operation I/F 410, and an input/output I/F 413.

The CPU 401 collectively controls the entire blocks of the PC by using programs and data stored in the main memory 402 on an as needed basis. The main memory 402 is constituted by a RAM (Ransom Access Memory). The main memory 402 is used as a work area of the CPU 401 and the like, and temporarily retains an OS, various programs during execution, and various data items serving as the target of a process such as generation of display data or the like. In addition, the main memory 402 is also used as a storage area of image data. With a DMA (Direct Memory Access) function of the CPU 401, it is possible to implement high-speed transfer of image data between the main memory 402 and the graphics board 404. The graphics board 404 outputs an image processing result to the display device 103. The display device 103 is a display device which uses, e.g., a liquid crystal, an EL (Electro-luminescence), or the like. As the form of the display device 103, a form in which the display device is connected as an external device is assumed, but a PC integrated with the display device may also be assumed as the form of the display device 103. For example, a note PC corresponds to the form thereof. The arithmetic processing board 403 includes a processor of which specific processing functions such as image processing and the like are improved, and a buffer memory (not shown). In the following description, a description will be given based on the assumption that the CPU 401 is used for various arithmetic processing and data processing, and the main memory 402 is used as a memory area, but it is also possible to use the processor and the buffer memory in the arithmetic processing board, and the use thereof is within the scope of the present invention.

To the input/output I/F 413, the data server 104 is connected via the LAN I/F 406, and the storage device 408 is connected via the storage device I/F 407, the imaging device 101 is connected via the external device I/F 409. In addition, input devices such as a keyboard 411 and a mouse 412 are connected to the input/output I/F 413 via the operation I/F 410. The storage device 408 is an auxiliary storage device which fixedly stores information such as the OS, programs, firmware, and various parameters executed by the CPU 401. In addition, the storage device 408 is also used as the storage area of image data sent from the imaging device 101. As the storage device 408, a magnetic disk drive such as an HDD (Hard Disk Drive) or the like, and a semiconductor device such as an SSD (Solid State Drive) or a flash memory are used. As the input device, a pointing device such as the keyboard 411 or the mouse 412 is assumed, but it is also possible to adopt a configuration in which the screen of the display device 103 serves as a direct input device such as a touch panel. In this case, the touch panel can be integrated with the display device 103.

(Slide)

Figure 5:
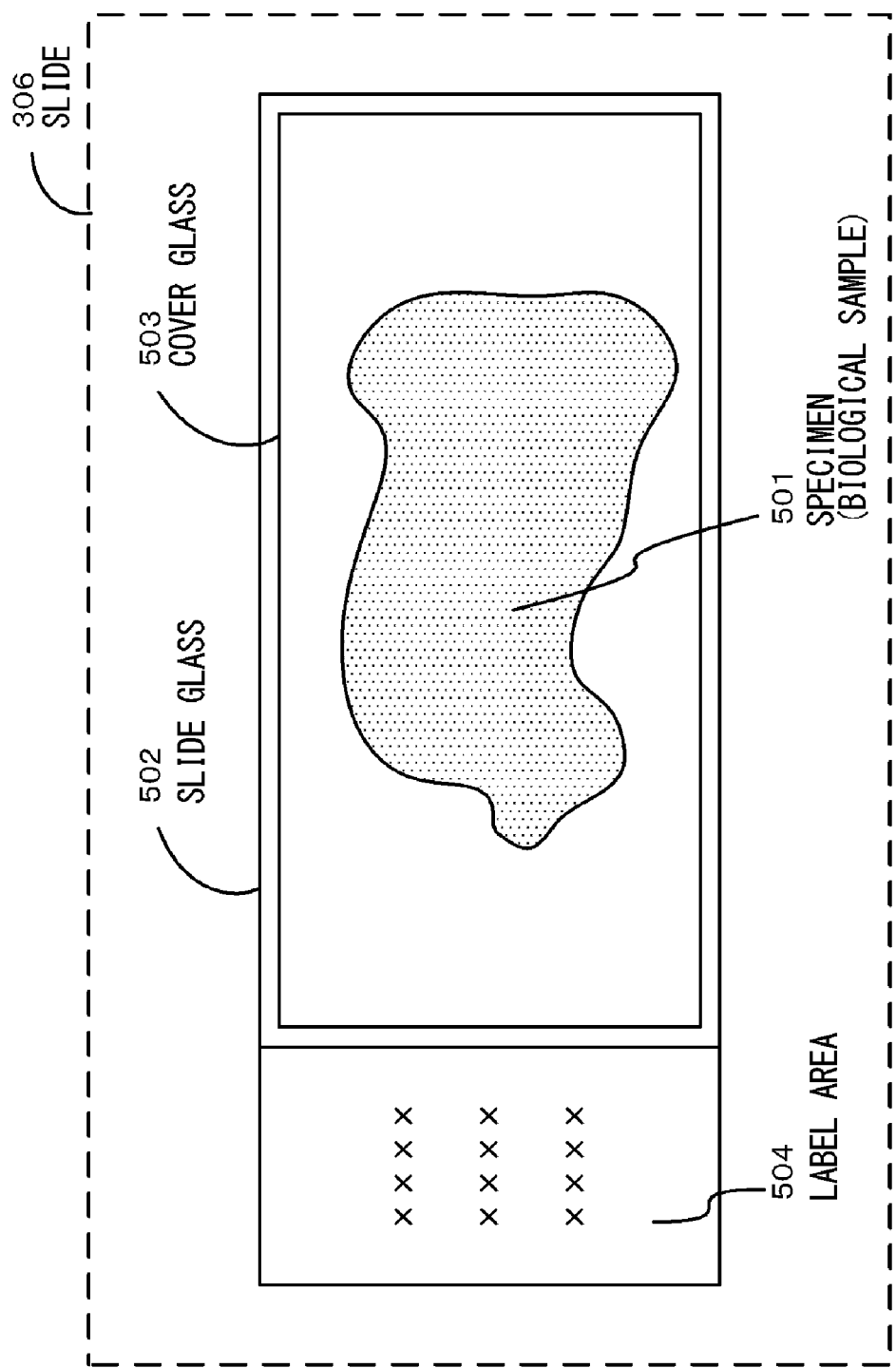
FIG. 5 is a schematic view showing a slide on which a specimen (biological sample) is placed.

FIG. 5 is a schematic view showing the slide 306 on which a specimen (biological sample) 501 is placed. In the slide of a pathology specimen, the specimen 501 placed on a slide glass 502 is fixed by an encapsulant (not shown) and a cover glass 503 placed thereon. The size and the thickness of the specimen 501 differ depending on the specimen 501. Further, a label area 504 in which information related to the specimen is recorded is present on the slide glass 502. Recording of the information in the label area 504 may be writing using a pen, or printing of a bar code or a two-dimensional code. Alternatively, a storage medium capable of storing information using an electric, magnetic, or optical method may be provided in the label area 504. In the following embodiments, a description will be given by using the slide of the pathology specimen shown in FIG. 5 as a subject as an example.

(Stained Specimen)

Figure 6:
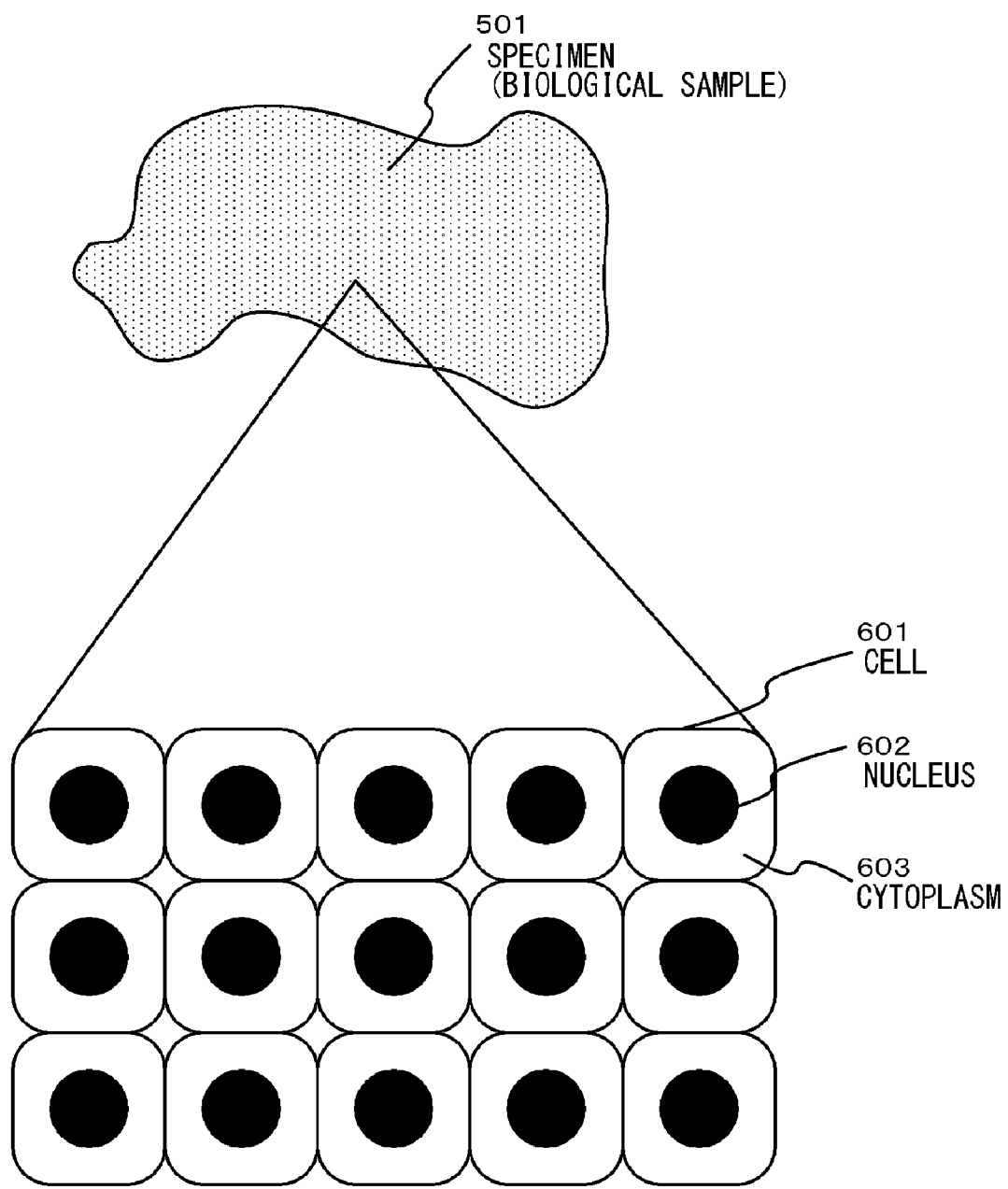
FIG. 6 is a schematic view for explaining a stained specimen (biological sample)

FIG. 6 is a schematic view for explaining a stained specimen (biological sample). In the pathology specimen, the thickness of the specimen (biological sample) 501 is about 4 to 5 μm, and the size thereof is a size which allows accommodation in the slide of 2 to 3 inches. When the specimen (biological sample) 501 is magnified, it is possible to observe an arrangement of a cell 601 corresponding to a tissue. The cell 601 is constituted by a nucleus 602 and cytoplasm 603. The arrangement and size of the cell and the shape and size of the nucleus constituting the cell differ depending on the tissue. For example, in the case of a liver cell, the diameter of the cell is about 20 μm, and the size of the nucleus is about 5 to 15 μm. The biological sample is colorless and transparent, and hence it is not easy to discern the tissue structure when the biological sample is observed without any alteration. Consequently, in order to facilitate the observation of the tissue structure of the specimen, staining is performed in the pathology specimen. HE (hematoxylin eosin) staining is basically performed in histopathology, but immunostaining and FISH (Fluorescence In Situ Hybridization) are also performed in accordance with the diagnosis purpose. In the present embodiment, a description will be given by using HE staining which is normally performed in histopathology as an example. In HE staining, chromatin in the nucleus is stained so as to be perse-colored, and cytoplasm is stained so as to be pale red-colored.

(Focus Position and Z-Axis Sign)

Figure 7:
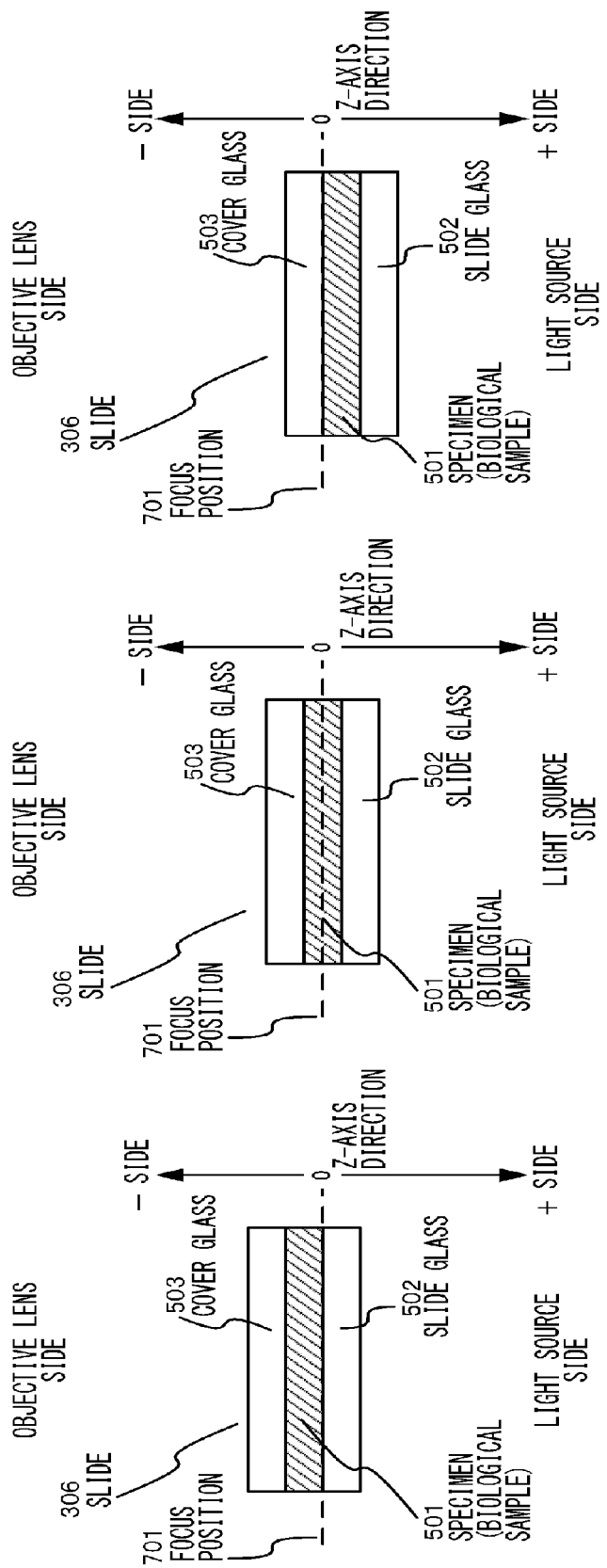
FIGS. 7A to 7C are schematic views for explaining a focus position and a Z-axis sign.

FIGS. 7A to 7C are schematic views for explaining a focus position and a Z-axis sign. In the present embodiment, the Z axis is assumed to have the side of a light source (the side of the illumination unit 301) as a positive (+) direction, and the side of an objective lens (the side of the image-forming optical system 307) as a negative (−) direction. In addition, a focus position 701 is assumed to be a position of a plane optically conjugate with the imaging surface of the imaging sensor 308.

FIG. 7A shows a state in which a Z position of the center of the thickness of the specimen (biological sample) 501 is on the − side relative to the focus position 701. In the case of the specimen (biological sample) having a small change in transmittance and a small change in refractive index, a negative (bright) image having a negative (bright) contrast is obtained. The negative (bright) image is an image formed such that an area in which the refractive index is high is bright and an area in which the refractive index is low is dark. FIG. 7B shows a state in which the Z position of the center of the thickness of the specimen (biological sample) 501 is at the focus position 701. In the case of the specimen (biological sample) having a small change in transmittance and a small change in refractive index, the image cannot be obtained. FIG. 7C shows a state in which the Z position of the center of the thickness of the specimen (biological sample) 501 is on the + side relative to the focus position 701. In the case of the specimen (biological sample) having a small change in transmittance and a small change in refractive index, a positive (dark) image having a positive (dark) contrast is obtained. The positive (dark) image is an image formed such that an area in which the refractive index is high is dark and an area in which the refractive index is low is bright.

(Basic Structure of Optical System of Microscope)

Figure 8:
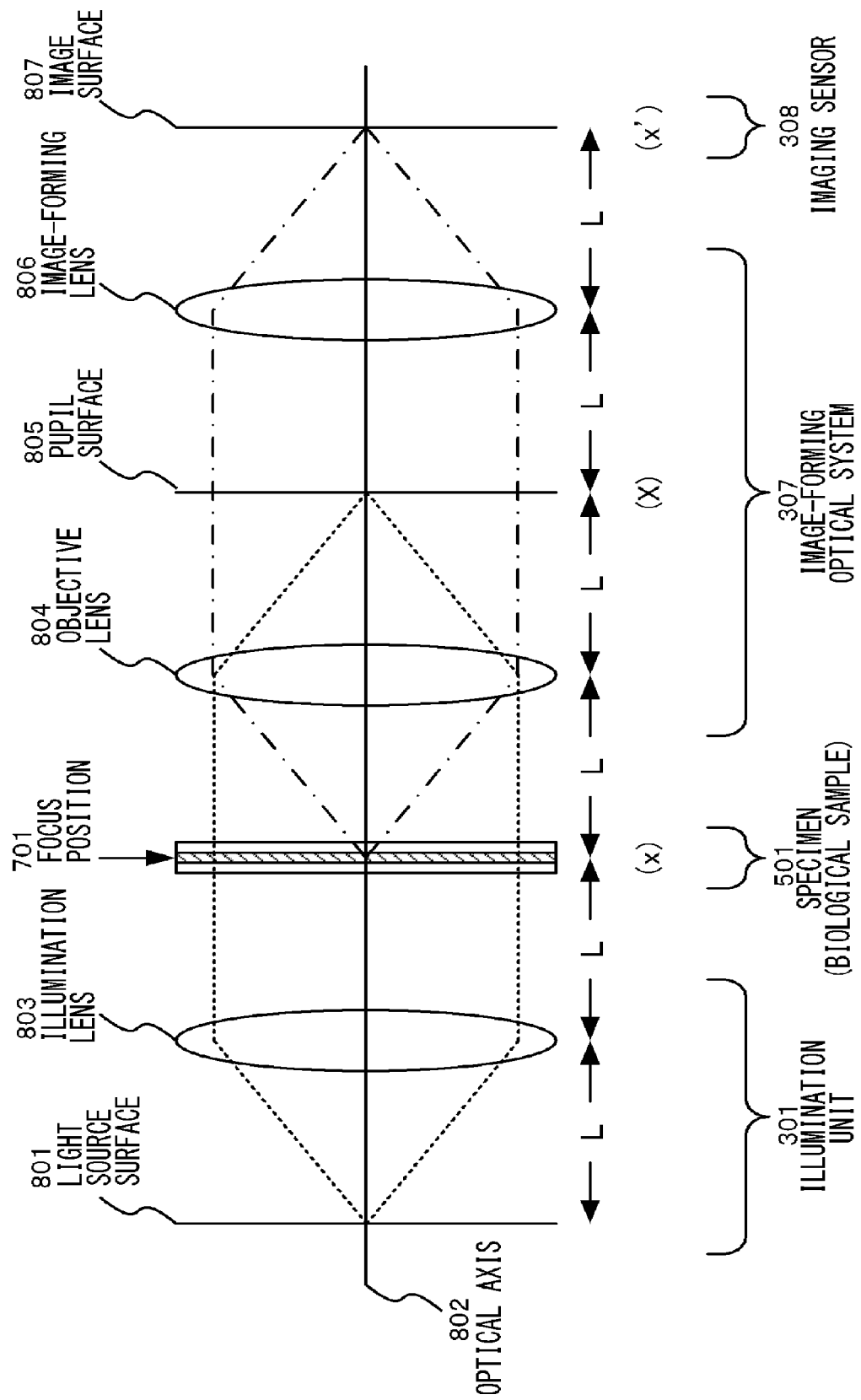
FIG. 8 is a schematic view for explaining a basic structure of an optical system of a microscope.

FIG. 8 is a schematic view for explaining the basic structure of the optical system of the microscope. The optical system of the microscope is constituted by the illumination unit 301, the image-forming optical system 307, and the imaging sensor 308. The illumination unit 301 is a Koehler illumination system, and includes a surface light source on a light source surface 801 and an illumination lens 803. The surface light source having a point of intersection of the light source surface 801 and an optical axis 802 as the center is provided on the light source surface 801. The image-forming optical system 307 has an objective lens 804, a pupil surface 805, and an image-forming lens 806. By the image-forming optical system 307, the image of the specimen (biological sample) 501 is formed on an image surface 807. The light source surface 801, the illumination lens 803, the specimen (biological sample) 501, the objective lens 804, the pupil surface 805, the image-forming lens 806, and the image surface 807 are disposed at intervals of a distance L. The distance L is a focus distance of each of the illumination lens 803, the objective lens 804, and the image-forming lens 806.

In the following description, an in-plane coordinate at the focus position 701 is represented by x, an in-plane coordinate in the pupil surface 805 is represented by X, and an in-plane coordinate in the image surface 807 is represented by x'. In addition, in order to simplify the description, the description will be given by using a one-dimensional (x, X, or x') image, but the same applies to the case of a two-dimensional (xy, XY, or x'y') image.

(Amplitude Change and Phase Change of Stained Specimen)

Figure 9B:
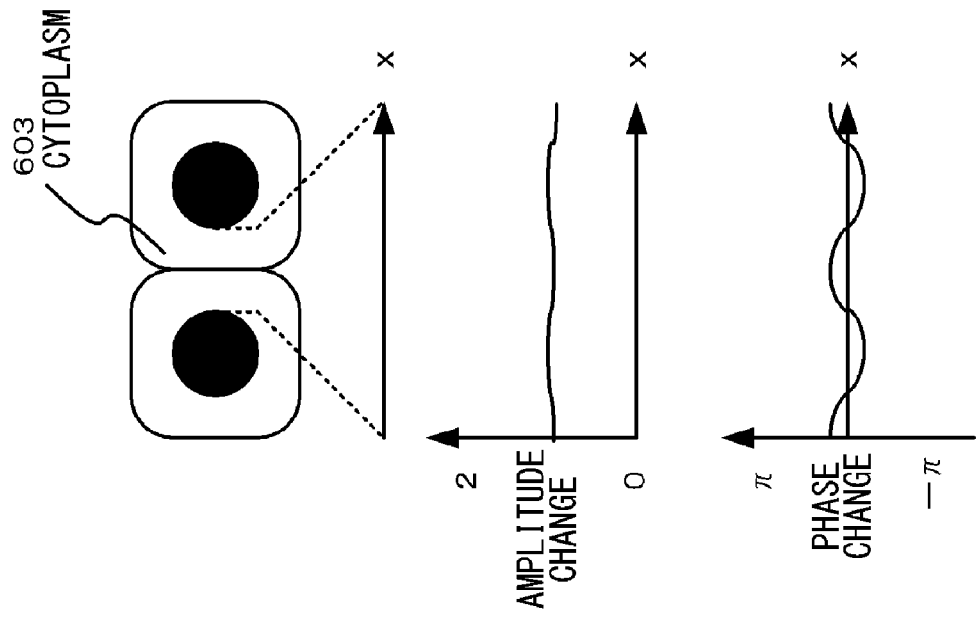
FIGS. 9A and 9B are schematic views for explaining amplitude change and phase change of the stained specimen.
Figure 9A:
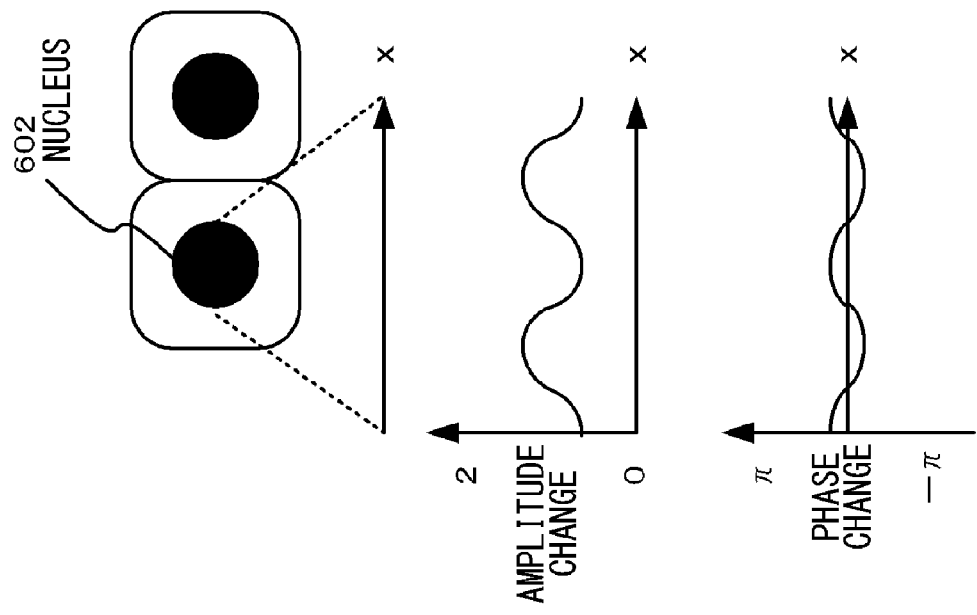

Each of FIGS. 9A and 9B is a schematic view for explaining amplitude change and phase change of the stained specimen. Herein, a complex amplitude distribution $u(x)$ of the specimen (biological sample) is represented by the following expression.

$$u(x)=A(x) \cdot P(x)$$

$$A(x)=1+a \cdot \cos(2\pi\mu_1 x)$$

$$P(x)=1+i \cdot b \cdot \cos(2\pi\mu_2 x)(b<<\pi) \quad \text{[Math. 1]}$$

$A(x)$ is an expression which represents the amplitude change, and $P(x)$ is an expression which represents the phase change. X is a position on a one-dimensional coordinate. a and b are parameters which represent an amplitude change amount and a phase change amount, respectively. $\mu_1$ and $\mu_2$ are a spatial frequency of the amplitude change and a spatial frequency of the phase change, respectively. i is an imaginary unit. In this expression, it is assumed that each of the amplitude change and the phase change in the stained specimen serving as the target in the pathology is relatively gentle and a sinusoidal wave can approximate it. In addition, it is assumed that the phase change is sufficiently smaller than π. In the stained specimen (biological sample) serving as the target in the pathology, since it is known that each of the amplitude and the phase is not changed sharply and the stained specimen is a weak phase object, these assumptions are appropriate. Hereinafter, in order to simplify the description, the description will be given based on the assumption that the amplitude change and the phase change of the specimen have the single spatial frequencies $\mu_1$ and $\mu_2$.

FIG. 9A is a schematic view for explaining the amplitude change and the phase change of the nucleus 602 in HE staining. The upper part of FIG. 9A is a schematic view of the cell corresponding to FIG. 6, the middle part thereof is a graph showing the amplitude change of the nucleus 602, and the lower part thereof is a graph showing the phase change of the nucleus 602. In HE staining, chromatin in the nucleus 602 is stained so as to be perse-colored, and the amplitude change amount thereof is relatively large as compared with that of cytoplasm. The middle part of FIG. 9A simulates a chromatin distribution in the nucleus 602, and shows that the transmittance in an area where the chromatin coagulates is low. The lower part of FIG. 9A shows that the coagulation of the chromatin and the refractive index are correlated with each other, and the refractive index in the area where the chromatin coagulates is high. Hereinafter, a description will be given based on the assumption that the parameters of the complex amplitude distribution model of the nucleus 602 satisfy the amplitude change amount a=−0.32, the phase change amount b=0.36, $\mu_1$=0.20 (/μm), and $\mu_2$=0.20 (/μm).

FIG. 9B is a schematic view for explaining the amplitude change and the phase change of the cytoplasm 603 in HE staining. The upper part of FIG. 9B is a schematic view of the cell corresponding to FIG. 6, the middle part thereof is a graph showing the amplitude change of the cytoplasm 603, and the lower part thereof is a graph showing the phase change of the cytoplasm 603. In HE staining, the cytoplasm 603 is stained so as to be pale red-colored, and the amplitude change amount thereof is relatively small as compared with that of the nucleus. The middle part of FIG. 9B simulates the distribution of organelle in the cytoplasm 603, and shows that the transmittance in an area where the organelle coagulates is low. The lower part of FIG. 9B shows that the coagulation of the organelle and the refractive index are correlated with each other, and the refractive index in an area where the organelle coagulates is high. Hereinafter, a description will be given based on the assumption that the parameters of the complex amplitude distribution model of the cytoplasm 603 satisfy the amplitude change amount a=−0.02, the phase change amount b=0.36, $\mu_1$=0.20 (/μm), and $\mu_2$=0.20 (/μm).

When the amplitude change and the phase change of the biological cell in HE staining described in connection with FIGS. 9A and 9B are simplified and summarized, the refractive index in an area which is darkly stained and has a small transmittance is high, and the refractive index in an area which is not stained or lightly stained and has a high transmittance is low.

(Diffraction Image)

Figure 10A:
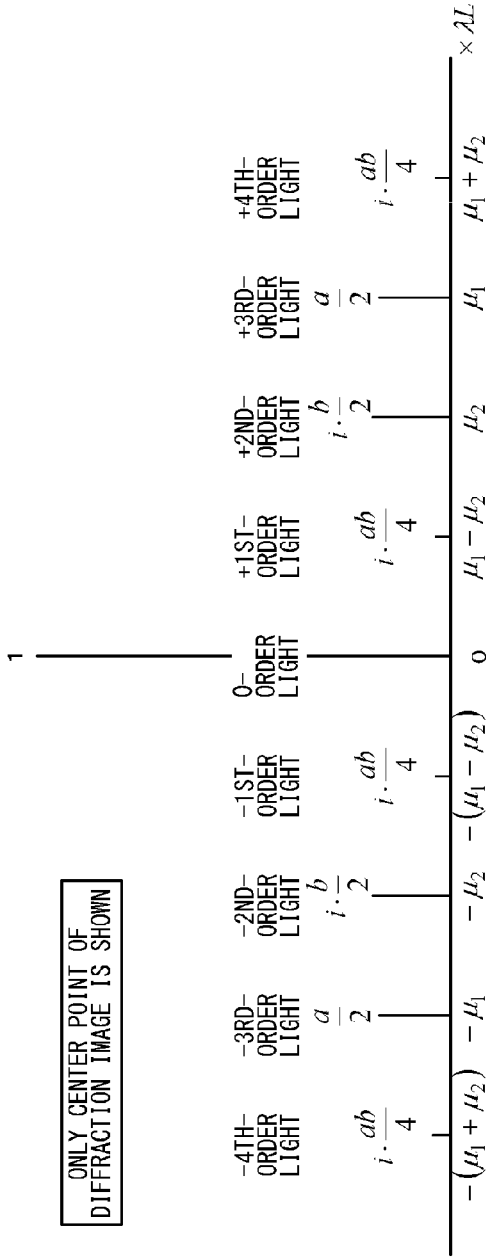
FIGS. 10A and 10B are schematic views for explaining a diffraction image in a pupil surface.
Figure 10B:
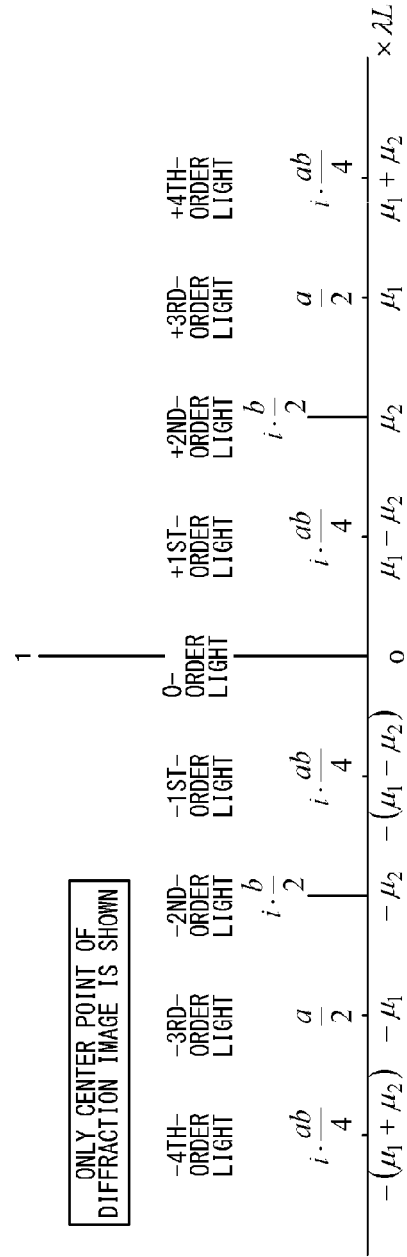

Each of FIGS. 10A and 10B is a schematic view for explaining a diffraction image in the pupil surface 805. The vertical axis indicates the complex amplitude, and the horizontal axis indicates the spatial frequency. FIG. 10A shows the diffraction images in the pupil surface 805 in the case where attention is locally focused on the area of the nucleus 602. In general, the microscope shows the diffraction image having a spread due to partial coherent image formation with the surface light source, but only the center point of the diffraction image is shown in this drawing. The wavelength of the light source is represented by λ. Hereinafter, in order to simplify the description, the description will be given by using the single wavelength λ. In the complex amplitude distribution u(x), nine diffraction images are formed in the pupil surface 805. In order to clarify general characteristics of the diffraction image, the depiction is made based on the assumption that $\mu_1-\mu_2<\mu_2<\mu_1<\mu_1+\mu_2$ is satisfied, but no inconvenience arises in the following description even when the magnitude relationship is changed. For example, in the case where $\mu_1=0.20$ (/μm) and $\mu_2=0.20$ (/μm) are satisfied, the diffraction images at the spatial frequencies of 0 and $\mu_1-\mu_2$ in the pupil surface 805 are formed so as to be stacked on each other at the spatial frequency of 0. The imaginary unit i is shown at each of ±1st-order lights, ±2nd-order lights, and ±4th-order lights, and these diffraction images are shifted in phase by π/2 relative to a 0-order light and ±3rd-order lights.

From FIG. 10A, it can be seen that, in the complex amplitude distribution model of the nucleus 602, apart from the 0-order light, relatively large ±2nd-order lights and ±3rd-order lights can be obtained. Each of the ±2nd-order lights is the diffraction image in which the phase difference is reflected, and each of the ±3rd-order lights is the diffraction image in which the amplitude change is reflected. This suggests that the amplitude change and the phase change equally contribute to the image formation. Similarly, FIG. 10B shows the diffraction images in the pupil surface 805 in the case where attention is locally focused on the area of the cytoplasm 603. In the complex amplitude distribution model of the cytoplasm 603, apart from the 0-order light, only the ±2nd-order lights are relatively large. This suggests that the phase change mainly contributes to the image formation.

In the microscope, a partial coherent illumination method in which the contrast and the resolution are well-balanced is normally used, but it is also possible to use coherent illumination and incoherent illumination by operating an illumination diaphragm. A state in which the illumination diaphragm is narrowed (coherent factor σ≈0) corresponds to the coherent illumination, and a state in which the illumination diaphragm is opened (coherent factor σ≈1) corresponds to the incoherent illumination. The coherent factor σ is a ratio between the numerical aperture of the illumination light source and the numerical aperture of the image-forming optical system. The present invention can be applied to any of the partial coherent illumination, the coherent illumination, and the incoherent illumination irrespective of the illumination method.

(Image Surface Intensity Distribution)

On the image surface 807, an image by the interference of these nine diffraction images having the spreads is formed. The intensity distribution of the specimen (biological sample) can be represented by the following expression.

$$|u'(x',d)|^2 = \Sigma|u'_1|^2 + \Sigma|u'_2(x',d)|^2 + \Sigma|u'_3(x',d)|^2 + \Sigma|u'_4(x',d)|^2 \quad [\text{Math. 2}]$$

d is a defocus amount (μm), and represents the shift amount of the center of the thickness of the specimen in the Z direction (optical axis direction) relative to the focus position. The left side denotes the intensity distribution of the specimen (biological sample). The first term on the right side is a term indicative of the intensity distribution of a component of the spatial frequency 0. The term is the sum of nine terms such as the square of the absolute value of the 0-order light, the square of the absolute value of the +1 st-order light, . . . , and serves as a constant. The second term on the right side is a term indicative of the intensity distribution by the interference of two pairs having the same absolute value of the spatial frequency difference and two diffraction images having the phase difference π/2. The term is the sum of nine terms such as the 0-order light and the ±1st-order lights, the ±2nd-order lights and the ±3rd-order lights, . . . . The third term on the right side is a term indicative of the intensity distribution by the interference of two pairs having the same absolute value of the spatial frequency difference and two diffraction images having the phase difference 0. The term is the sum of seven terms such as the 0-order light and the ±3rd-order lights, the ±1st-order lights and the ±2nd-order lights, . . . . The fourth term on the right side is a term indicative of the intensity distribution by the interference of two diffraction images having the same absolute value of the spatial frequency. The term is the sum of four terms such as the +1 st-order light and the −1st order light, . . . .

Herein, the two diffraction images related to the interference are represented by the following expression.

$$\exp(i \cdot P_{hs1}) \cdot A_{mp1} \cdot \delta(X - f_1 \cdot \lambda L) \quad [\text{Math. 3}]$$
$$\exp(i \cdot P_{hs2}) \cdot A_{mp2} \cdot \delta(X - f_2 \cdot \lambda L)$$
$$(f_1 > f_2)$$

However, in expression, similarly to FIGS. 10A and 10B, the spread of the diffraction image is not considered and only the center point of the diffraction image is considered. Each of $P_{hs1}$ and $P_{hs2}$ represents the phase of the diffraction image, and is π/2 or 0. Each of $A_{mp1}$ and $A_{mp2}$ represents the size of the diffraction image. δ represents Dirac δ function. Each of $f_1$ and $f_2$ represents the spatial frequency of the diffraction image. When the +1st-order light of FIGS. 10A and 10B is taken for example, $P_{hs1}=\pi/2$ ($\exp(i \cdot P_{hs1})=i$), $A_{mp1}=ab/4$, and $f_1=\mu_1-\mu_2$ are satisfied.

The intensity distribution by the interference of two pairs having the same absolute value of the spatial frequency difference and two diffraction images having the phase difference π/2 can be represented by the following expression by utilizing the above expression of the two diffraction images related to the interference.

$$|u'_2(x',d)|^2 = \quad [\text{Math. 4}]$$
$$A_{mp} \cdot \{(i \cdot \exp(i \cdot (P_{hs1} - P_{hs2}))) \cdot \sin(\pi d \lambda (f_1^2 - f_2^2))\} \cdot$$
$$\cos(2\pi(f_1 - f_2)x') \cdot$$
$$\frac{2 \cdot J_1(2\pi \cdot d \cdot \sigma \cdot (f_1 - f_2) \cdot NA)}{2\pi \cdot d \cdot \sigma(f_1 - f_2) \cdot NA} \cdot S(f_1 - f_2)$$

Two pairs having the same absolute value of the spatial frequency difference and two diffraction images having the phase difference π/2 are, e.g., a pair of the +3rd-order light and the +1st-order light and a pair of the −3rd-order light and the −1st-order light. However, the following expression is satisfied.

$$A_{mp} = 2 \cdot 2 \cdot \text{Re}[A_{mp1} \cdot A_{mp2}] \quad [\text{Math. 5}]$$
$$i \cdot (P_{hs1} - P_{hs2}) = \begin{cases} -1: & P_{hs1} - P_{hs2} = +i \\ +1: & P_{hs1} - P_{hs2} = -i \end{cases}$$

J1 represents a first-class first-order Bessel function. σ represents the coherent factor, and NA represents the numerical aperture of the image-forming optical system. S represents a function indicative of shading of the diffraction image having the spread in the pupil.

Similarly, the intensity distribution by the interference of two pairs having the same absolute value of the spatial frequency difference and two diffraction images having the phase difference 0 can be represented by the following expression.

$$|u'_3(x', d)|^2 = A_{mp} \cdot \cos(\pi d \lambda (f_1^2 - f_2^2)) \cdot \cos(2\pi(f_1 - f_2)x') \cdot \frac{2 \cdot J_1(2\pi \cdot d \cdot \sigma \cdot (f_1 - f_2) \cdot NA)}{2\pi \cdot d \cdot \sigma(f_1 - f_2) \cdot NA} \cdot S(f_1 - f_2)$$ [Math. 6]

Two pairs having the same absolute value of the spatial frequency difference and two diffraction images having the phase difference 0 are, e.g., a pair of the +2nd-order light and the +1st-order light and a pair of the −2nd-order light and the −1st-order light.

In addition, the intensity distribution by the interference of two diffraction images having the same absolute value of the spatial frequency can be represented by the following expression.

$$|u'_4(x', d)|^2 = 2 \cdot \text{Re}[A_{mp1} \cdot A_{mp2}] \cdot \cos(\pi d \lambda (f_1^2 - f_2^2)) \cdot \cos(2\pi(f_1 - f_2)x') \cdot \frac{2 \cdot J_1(2\pi \cdot d \cdot \sigma \cdot (f_1 - f_2) \cdot NA)}{2\pi \cdot d \cdot \sigma(f_1 - f_2) \cdot NA} \cdot S(f_1 - f_2)$$ [Math. 7]

Two diffraction images having the same absolute value of the spatial frequency are, e.g., the +1st-order light and the −1st-order light.

Since the intensity distribution by the interference of two pairs having the same absolute value of the spatial frequency difference and two diffraction images having the phase difference π/2 is an odd function with respect to d, the intensity distribution is newly represented by the following expression.

$$\Sigma |u'_2(x', d)|^2 = F_{odd|d}(x', d)$$ [Math. 8]

Similarly, since each of the intensity distribution by the interference of two pairs having the same absolute value of the spatial frequency difference and two diffraction images having the phase difference 0 and the intensity distribution by the interference of two diffraction images having the same absolute value of the spatial frequency is an even function with respect to d, the intensity distribution is newly represented by the following expression.

$$\Sigma |u'_3(x', d)|^2 + \Sigma |u'_4(x', d)|^2 = F_{even|d}(x', d)$$ [Math. 9]

When the intensity distribution of the specimen (biological sample) is newly represented by using the results described above, the intensity distribution thereof is represented by the following expression.

$$|u'(x', d)|^2 = \text{Const} + F_{odd|d}(x', d) + F_{even|d}(x', d)$$ [Math. 10]

Const. is a mark denoting a constant.

(Contrast Change of Stained Specimen)

Each of FIGS. 11A to 11F is a schematic view for explaining contrast change of the stained specimen.

Each of FIG. 11A, FIG. 11B, and FIG. 11C shows a light intensity in the complex amplitude distribution model of the nucleus 602 described in connection with FIG. 9A. FIG. 11A, FIG. 11B, and FIG. 11C correspond to the defocus amounts d=+1 (μm), d=0 (μm), and d=−1 (μm), respectively. In the complex amplitude distribution model of the nucleus 602, it is possible to obtain the light intensity having the highest contrast with d=0 (μm), but it is also possible to obtain substantially the same contrast as that of d=0 (μm) even with d=+1 (μm). On the other hand, with d=−1 (μm), the contrast is lower than those of the other two defocus amounts. When the defocus in the positive Z direction is compared with the defocus in the negative Z direction based on the assumption that the absolute values of the defocus amount d are equal to each other, the positive defocus amount tends to have a higher contrast. This is due to that the coagulation of the chromatin and the refractive index are correlated with each other in the complex amplitude distribution model of the nucleus 602 and the refractive index in the area having the low transmittance where the chromatin coagulates is high. In FIG. 11A, the light intensity having the contrast higher than that in FIG. 11C is obtained due to the influence of the positive (dark) contrast described in connection with FIG. 7C. That is, the contrast resulting from the amplitude change and the contrast resulting from the phase change act on each other, and the high contrast is thereby obtained. When the absolute value of the defocus amount d is increased, the contrast is reduced while maintaining the above tendency. The reduction in contrast due to the increase in defocus mount d corresponds to blurring of the image at the defocus position.

Each of FIG. 11D, FIG. 11E, and FIG. 11F shows the light intensity in the complex amplitude distribution model of the cytoplasm 603 described in connection with FIG. 9B. FIG. 11D, FIG. 11E, and FIG. 11F correspond to the defocus amounts d=+1 (μm), d=0 (μm), and d=−1 (μm), respectively. In the complex amplitude distribution model of the cytoplasm 603, it is possible to obtain the light intensity having the high contrast with d=+1 (μm), and the light intensity having the low contrast is obtained with d=−1 (μm). It is possible to obtain the contrast even with d=0 (μm). When the defocus in the positive Z direction is compared with the defocus in the negative Z direction based on the assumption that the absolute values of the defocus amount d are equal to each other, the positive defocus amount tends to have a higher contrast. This is due to that the coagulation of the organelle and the refractive index are correlated with each other in the complex amplitude distribution model of the cytoplasm 603 and the refractive index in the area where the organelle coagulates is high. In FIG. 11D, it is possible to obtain the light intensity having the contrast higher than that in FIG. 11F due to the influence of the positive (dark) contrast described in connection with FIG. 7C. Similarly to the complex amplitude distribution model of the nucleus 602, the contrast resulting from the amplitude change and the contrast resulting from the phase change act on each other, and the high contrast is thereby obtained. In FIG. 7A and FIG. 7B, it is indicated that the contrast when the Z position of the center of the thickness of the specimen (biological sample) 501 is shifted to the + side is inverted from the contrast when the Z position is shifted to the − side, but the contrast is not inverted in FIG. 11D and FIG. 11F. This is because a low spatial frequency is assumed as the spatial frequency $\mu_2$. The spatial frequency dependence of the contrast change will be described in connection with FIG. 12. In addition, in FIG. 7B, the description that the image cannot be obtained in the case of the specimen (biological sample) having the small change in transmittance and the small change in refractive index has been given but, in the complex amplitude distribution model of the cytoplasm 603, the change in refractive index is relatively large, and hence the image can be obtained even with d=0 (μm).

(Phase Contrast)

Figure 12:
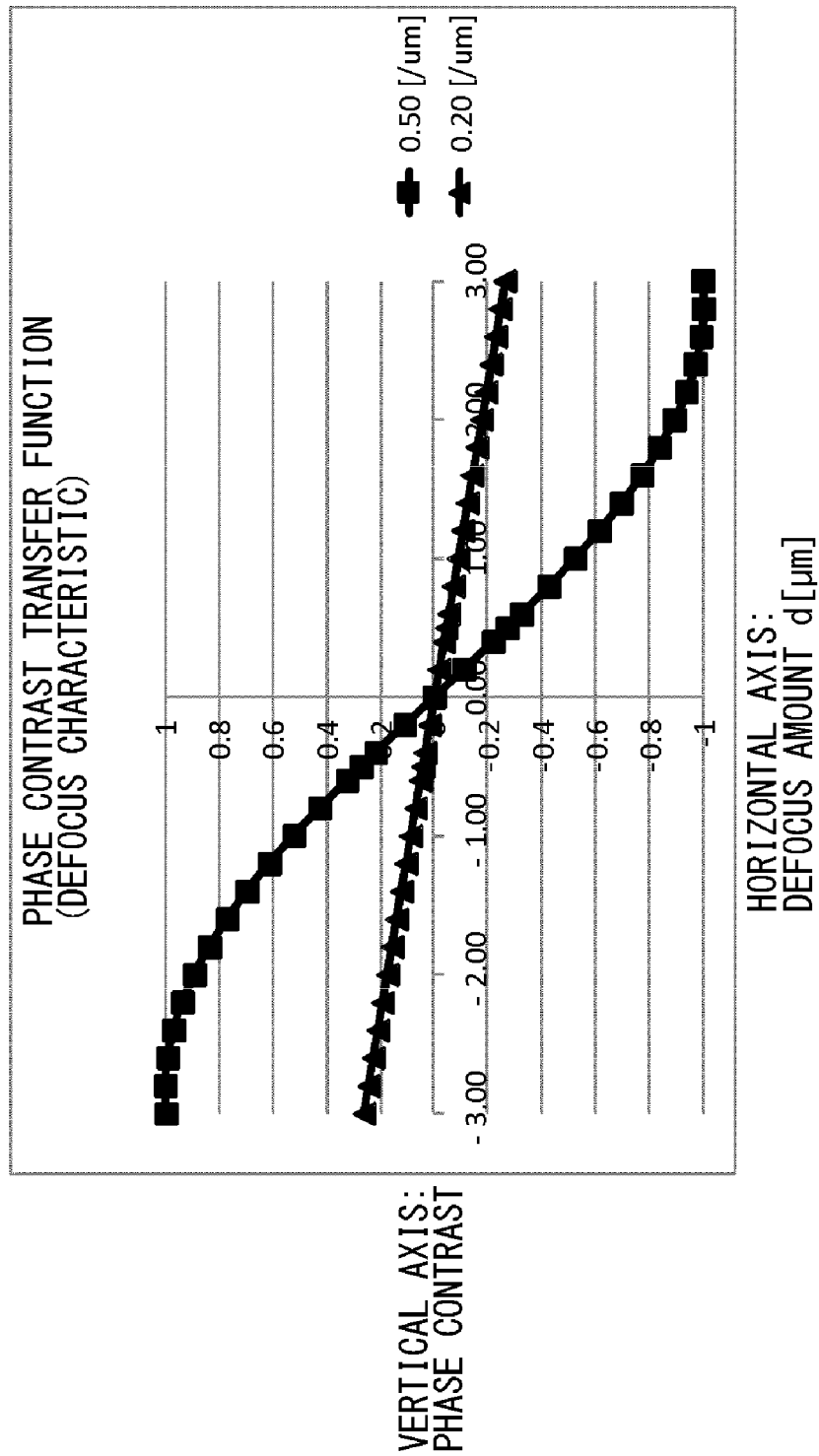
FIG. 12 is a schematic view for explaining spatial frequency dependence and Z position dependence of a phase contrast.

FIG. 12 is a schematic view for explaining the spatial frequency dependence and the Z position dependence of the phase contrast. The vertical axis indicates the phase contrast, and the horizontal axis indicates the defocus amount d (μm). The phase contrast is the SIN function included in expression which represents the intensity distribution by the interference of two diffraction images having the phase difference π/2, and can be represented by the following expression.

$$(i \cdot (P_{hs1} - P_{hs2})) \cdot \sin(\pi d \lambda (f_1^2 - f_2^2))$$ [Math. 11]

When consideration is given to the complex amplitude distribution model of the cytoplasm 603, as shown in FIG. 10B, the 0-order light and the ±2nd-order lights are dominant. Consequently, the phase contrast is shown based on the assumption that the following expression is satisfied.

$$i \cdot (P_{hs1} - P_{hs2}) = -1$$ [Math. 12]

From FIG. 12, it can be seen that the sign of the phase contrast is changed from the positive sign to the negative sign at the defocus amount d=0 (μm). This denotes that the contrast is inverted at the defocus amount d=0 (μm). When the defocus amount d>0 is satisfied, the positive (dark) contrast in FIG. 7C is obtained and, when the defocus amount d<0 is satisfied, the negative (bright) contrast in FIG. 7A is obtained. In addition, it can be seen that, when the spatial frequency $(f_1^2 - f_2^2)$ is high and when the defocus amount d is large, the influence of the contrast inversion becomes large. The contrast is not inverted in FIG. 11D and FIG. 11F because the influence of the phase contrast is small. When the spatial frequency $μ_2$ becomes high or when the defocus amount d becomes large, the contrast inversion is caused.

(Excessive Contrast Enhancement in Focus Stacking)

Figures 13A, 13B:
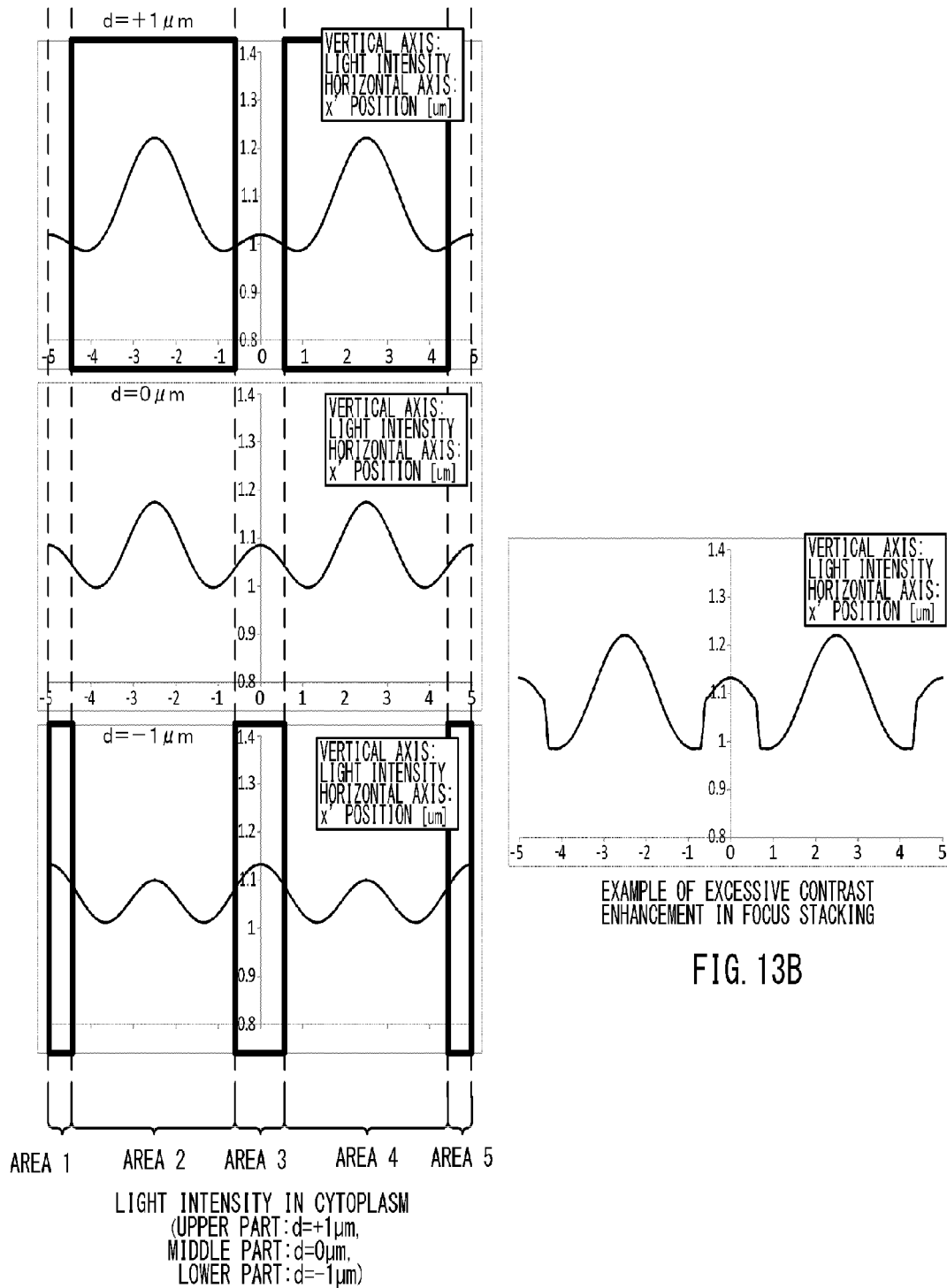
FIGS. 13A and 13B are schematic views for explaining excessive contrast enhancement in focus stacking.

Each of FIG. 13A and FIG. 13B is a schematic view for explaining excessive contrast enhancement in focus stacking. FIG. 13A shows the light intensity in the complex amplitude distribution model of the cytoplasm 603 described in connection with FIG. 9B. Graphs in the upper part, the middle part, and the lower part of FIG. 13A are the same as those in FIG. 11D, FIG. 11E, and FIG. 11F. Herein, consideration is given to execution of the focus stacking process based on the plurality of layer image data items acquired at different focus positions (i.e., with focus positions set at different depths in the specimen). The focus stacking process is an effective process when one image data item which is focused on all areas (also referred to as all-focused image data) is obtained. For example, when a plurality of nuclei are distributed discretely in the Z direction, it is possible to generate image data which is focused on all of the nuclei by the focus stacking process.

Each layer image data item normally includes the nucleus 602 and the cytoplasm 603. Herein, the focus stacking process of the area of the cytoplasm 603 will be described. In the focus stacking process, for example, the YX plane of the layer image data item is divided into a plurality of small areas, and the layer image data item at the Z position having the highest contrast is selected in each small area. Subsequently, one image data item which is focused on all of the areas is generated by combining (stitching) the image data items selected in the individual small areas together.

FIG. 13A shows an example of the focus stacking process which uses the layer image data items at three Z positions of the defocus amounts d=+1 (μm), d=0 (μm), and d=-1 (μm). As the small area, five areas of an area 1, an area 2, an area 3, an area 4, and an area 5 are considered. In each of the area 1, the area 3, and the area 5, d=-1 (μm) is selected as the Z position having the high contrast. In each of the area 2 and the area 4, d=+1 (μm) is selected as the Z position having the high contrast. In this manner, when the data items at the Z positions selected in the areas 1 to 5 are combined with each other, the image data exhibiting the light intensity shown in FIG. 13B is generated.

FIG. 13B shows an example in which the light intensity having the excessively enhanced contrast is generated by combination of the areas each having the high contrast. As two-dimensional image data, natural focus stacking image data is generated for the area of the nucleus, and focus stacking image data in which the contrast is unnaturally enhanced is generated for the area of the cytoplasm. There is a possibility that unnatural image data in which the contrast enhancement differs depending on the area in one focus stacking image data item is generated.

As the focus stacking process, in addition to the above method in which the areas each having the high contrast in the layer image data are combined with each other, a method in which image data having a deep depth of focus is generated by performing a two-dimensional or three-dimensional filtering process on the layer image data having been subjected to Fourier transformation is used. The present invention can be applied irrespective of the method of the focus stacking process.

(Focus Stacking Image Data Generation Process in First Embodiment)

Hereinbelow, a two-dimensional focus stacking image data generation process executed by the image processing apparatus 102 according to the first embodiment and its effects will be described by using FIGS. 14 to 20C.

Figure 14:
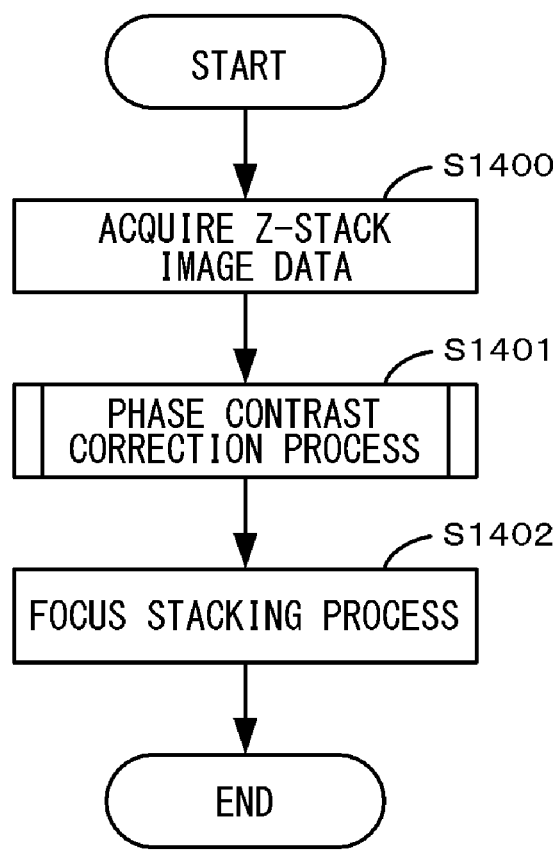
FIG. 14 is a flowchart of a two-dimensional focus stacking image data generation process of a first embodiment.

FIG. 14 is a flowchart showing the overall flow of the two-dimensional focus stacking image data generation process in the first embodiment. The process in each step shown in the flowchart is implemented by execution of an image processing program by the CPU 401 of the image processing apparatus 102.

In Step S1400, Z-stack image data on the specimen is acquired from the storage device 408 or the data server 104. The Z-stack image data is data including a plurality of layer image data items captured with the focus positions set at different depths (Z positions) in the specimen. The Z-stack image data includes at least one pair of two layer image data items having focus positions which are shifted oppositely, by equal distances, in a positive (+) direction and a negative (-) direction relative to a certain depth (reference depth) in the specimen. In the following description, it is assumed that an object to be observed (the nucleus, the cytoplasm) is present at the Z position of the center of the thickness of the specimen and a state in which the focus position matches the center of the thickness of the specimen is an in-focus position. In addition, it is assumed that the in-focus position is the reference depth (the defocus amount d=0), and the plurality of layer image data items are obtained while shifting (defocusing) the focus position at a predetermined pitch in each of the positive direction and the negative direction. Note that it is possible to determine the in-focus position (or the Z position of the center of the thickness of the specimen) using the thickness information on the specimen measured by the pre-measurement unit 320 and an autofocus process by the pre-measurement unit 320 or the imaging unit 310.

In Step S1401, a phase contrast correction process is performed on the original Z-stack image data acquired in S1400. As the phase contrast correction process, three process methods including a phase contrast reduction process, a first phase contrast inversion process, and a second phase contrast inversion process are used. The process flow of the phase contrast reduction process will be described in connection with FIG. 15, and the process flows of the first and second phase contrast inversion processes will be described in connection with FIG. 17. Note that the process in Step S1401 can be considered as the correction process or conversion process of the Z-stack image data in which the Z-stack image data in which the influence of the phase contrast is reduced or eliminated is generated from the original Z-stack image data.

In Step S1402, the focus stacking process is performed by using the Z-stack image data after the correction (conversion). The focus stacking process is the same as the process described in connection with FIG. 13A.

According to the above process steps, the influence of the phase contrast is suppressed by Step S1401, and hence it is possible to execute the focus stacking image data generation process which reduces the excessive contrast enhancement. The detail of the process in Step S1401 will be described hereinbelow.

(Phase Contrast Reduction Process)

Figure 15:
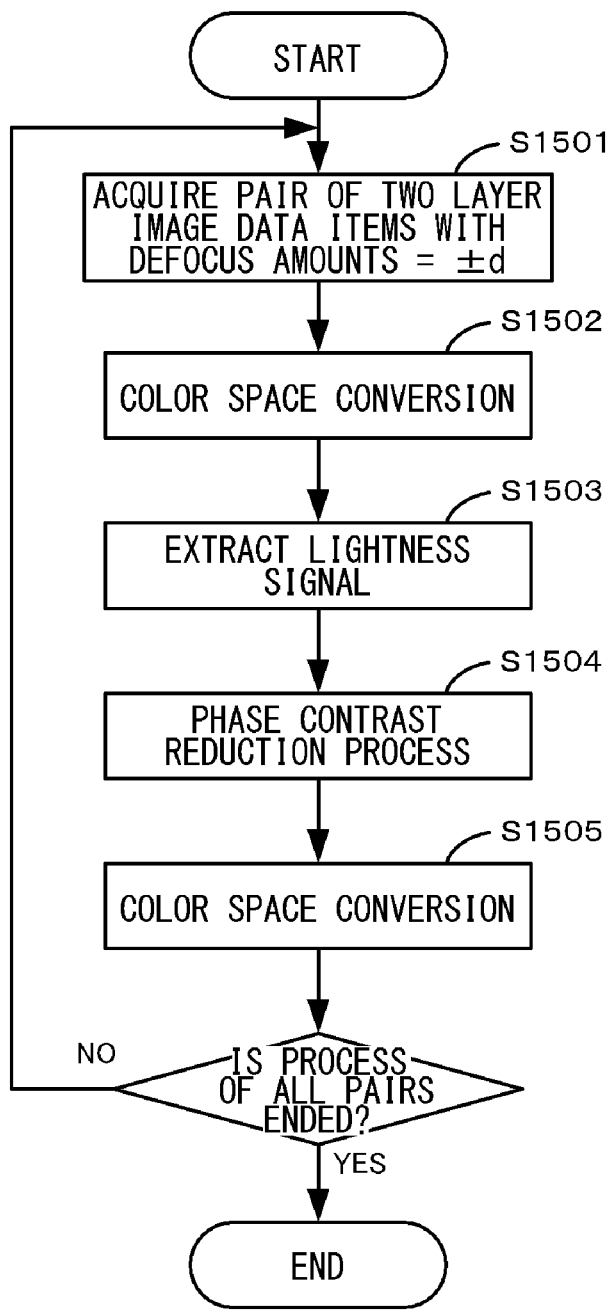
FIG. 15 is a flowchart of a phase contrast reduction process of the first embodiment.

FIG. 15 is a flowchart showing the process flow of the phase contrast reduction process in the first embodiment.

In Step S1501, a pair of two layer image data items having the Z positions (the defocus amounts d=±d) symmetrical with respect to the in-focus position (d=0) are selected.

In Step S1502, color space conversion is performed on the two layer image data items selected in Step S1501. In the present embodiment, the layer image data having RGB color spaces is converted to the layer image data having HSV color spaces. The HSV color spaces are color spaces including hue (H), chroma (S), and lightness (V). A hue component (H component), a chroma component (S component), and a lightness component (V component) of each pixel of image data having the HSV color spaces are referred to as a hue signal (H signal), a chroma signal (S signal), and a lightness signal (V signal), respectively.

In Step S1503, the lightness signal (V signal) is extracted from the image data having the HSV color spaces acquired in S1502.

In Step S1504, the phase contrast reduction process is performed on the lightness signal (V signal). When it is assumed that the lightness signals (V signals) of the layer image data items with the defocus amounts d=+d and d=−d are represented by $|u'(x', d_+)|^2$ and $|u'(x', d_-)|^2$, the phase contrast reduction process can be represented by the following expression.

$$\tfrac{1}{2} \cdot \{|u'(x',d_+)|^2 + |u'(x',d_-)|^2\} \quad \text{[Math. 13]}$$

That is, the phase contrast reduction process of the present embodiment is a process in which the lightness signals (V signals) of two layer image data items with the defocus amounts d=+d and d=−d are replaced with the average value of the lightness signals of the layer image data items. With this, a difference in phase contrast component between the two layer image data items is reduced to be smaller than the original difference.

In Step S1505, from the hue signal (H signal) and the chroma signal (S signal) which are acquired in S1502 and the lightness signal (V signal) after the correction acquired in S1504, the layer image data items (lightness correction layer image data) with the defocus amounts d=±d are generated. Subsequently, the lightness correction layer image data having the HSV color spaces is converted to the lightness correction layer image data having the RGB color spaces.

In the case where a plurality of pairs of two layer image data items having the same absolute value of the defocus amount d relative to the reference depth (the in-focus position d=0) are present in the original Z-stack image data, the processes from Step S1501 to Step S1505 are performed on all of the pairs.

According to the above process steps, it is possible to generate the plurality of layer image data items in which the phase contrast is reduced.

(First Effect of Phase Contrast Reduction Process)

Figure 16A:
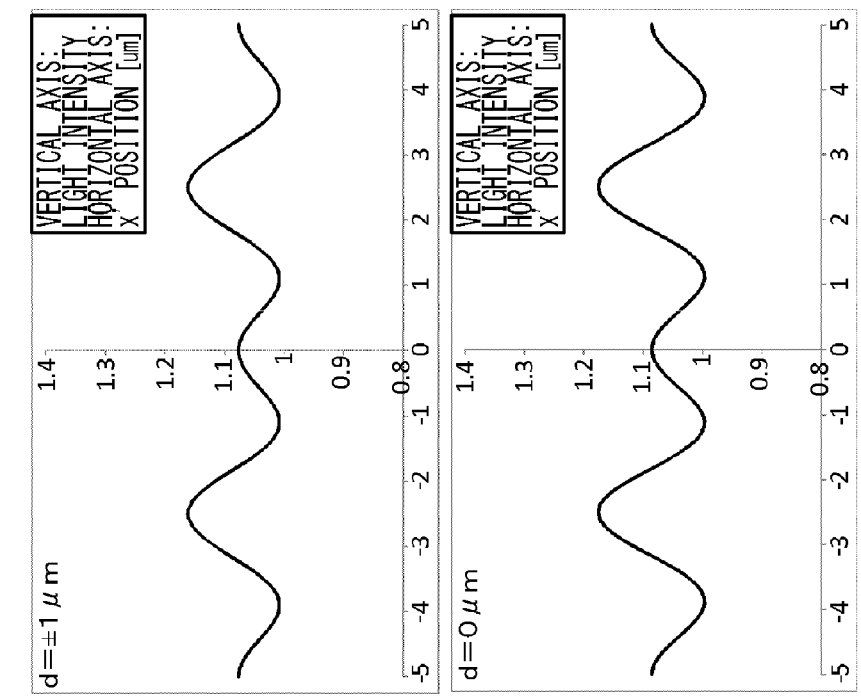
FIGS. 16A and 16B are schematic views for explaining the effect of the phase contrast reduction process of the first embodiment.
Figure 16B:
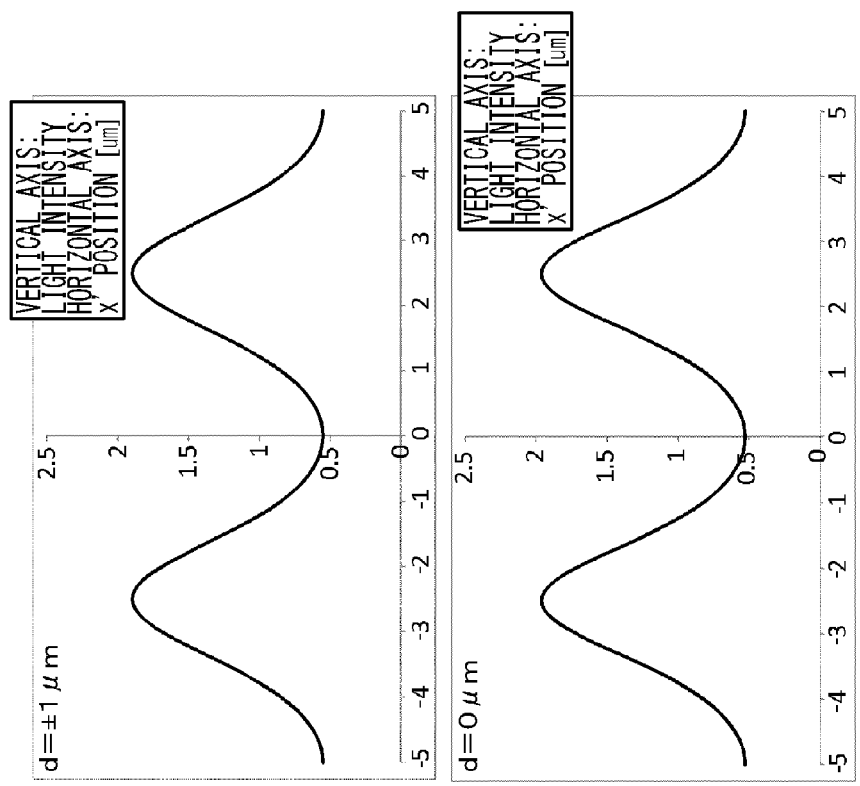

Each of FIG. 16A and FIG. 16B is a schematic view for explaining the effect of the phase contrast reduction process shown in FIG. 15. FIG. 16A shows the result of execution of the phase contrast reduction process to the light intensity in the complex amplitude distribution model of the nucleus 602. It can be seen that the same light intensity is obtained with the defocus amounts d=±1 (μm). When FIG. 11A is compared with FIG. 11C, it can be seen that the contrast obtained by averaging FIG. 11A and FIG. 11C is obtained in the upper part of FIG. 16A. FIG. 16B shows the result of execution of the phase contrast reduction process to the light intensity in the complex amplitude distribution model of the cytoplasm 603. Similarly to FIG. 16A, it can be seen that the same light intensity is obtained with the defocus amounts d=±1 (μm). When FIG. 11D is compared with FIG. 11F, it can be seen that the contrast obtained by averaging FIG. 11D and FIG. 11F is obtained in the upper part of FIG. 16B. The light intensities with the defocus amounts d=±d (μm) are equal to each other after the phase contrast reduction process, and hence it is possible to suppress the excessive contrast enhancement described in connection with FIG. 13A.

Herein, the physical background in the phase contrast reduction process will be described. The intensity distribution of the specimen (biological sample) is represented by the following expression.

$$|u'(x',d)|^2 = \text{Const.} + F_{odd|d}(x',d) + F_{even|d}(x',d) \quad \text{[Math. 14]}$$

First, consideration is given to difference image data of the lightness signals (V signal) of the layer image data items with the defocus amounts d=+d and d=−d represented by the following expression.

$$|u'(x',d_+)|^2 - |u'(x',d_-)|^2 \quad \text{[Math. 15]}$$

In the difference image data, the first term and the third term on the right side of the expression of the intensity distribution of the specimen are eliminated, and image data in which the odd function of the second term is doubled is obtained as shown in the following expression.

$$|u'(x', d_+)|^2 - |u'(x', d_-)|^2 = F_{odd|d}(x', d_+) - F_{odd|d}(x', d_-) \quad \text{[Math. 16]}$$
$$= 2 \cdot F_{odd|d}(x', d_+)$$
$$= -2 \cdot F_{odd|d}(x', d_-)$$

Each of $F_{odd|d}(x', d_+)$ and $F_{odd|d}(x', d_-)$ is a term including the phase contrast component, and this means that the term including the phase contrast component can be extracted using the difference image.

In the phase contrast reduction process, the term including the phase contrast component is eliminated from the lightness signal of the layer image data. The phase contrast reduction process to the layer image data with d>0 is represented by the following expression.

$$|u'(x', d_+)|^2 - \frac{1}{2} \cdot \{|u'(x', d_+)|^2 - |u'(x', d_-)|^2\} = \frac{1}{2}\{|u'(x', d_+)|^2 + |u'(x', d_-)|^2\}$$
$$= Const. + F_{even|d}(x', d_+)$$

[Math. 17]

Similarly, the contrast reduction process to the layer image data with d<0 is represented by the following expression.

$$|u'(x', d_-)|^2 + \frac{1}{2} \cdot \{|u'(x', d_+)|^2 - |u'(x', d_-)|^2\} = \frac{1}{2}\{|u'(x', d_+)|^2 + |u'(x', d_-)|^2\}$$
$$= Const. + F_{even|d}(x', d_-)$$

[Math. 18]

The phase contrast reduction process of the present embodiment corresponds to a process in which the term of the odd function of the intensity distribution of the specimen (biological sample) is eliminated. When referring to FIG. 10A and FIG. 10B, the phase contrast reduction process of the present embodiment also corresponds to a process in which the intensity distribution by the interference of two diffraction images having the phase difference π/2 is eliminated.

When consideration is given to the complex amplitude distribution model of the nucleus 602, the 0-order light, the ±2nd-order lights, and the ±3rd-order lights are dominant as shown in FIG. 10A, and hence consideration is given to these five diffraction images. Since the 0-order light and each of the ±2nd-order lights have the phase difference π/2 and each of the ±2nd-order lights and each of the ±3rd-order lights have the phase difference π/2, the light intensity component caused by the phase difference is reduced to some extent in the area of the nucleus 602. The reason for the reduction to some extent is that the intensity distribution by the interference of the diffraction images of the +2 nd-order light and the −2nd-order light remains without being eliminated.

When consideration is given to the complex amplitude distribution model of the cytoplasm 603, the 0-order light and the ±2nd-order lights are dominant as shown in FIG. 10B, and hence consideration is given to these three diffraction images. Since the 0-order light and each of the ±2nd-order lights have the phase difference π/2, the light intensity component caused by the phase difference is reduced to some extent in the area of the cytoplasm 603. The reason for the reduction to some extent is that the intensity distribution by the interference of the diffraction images of the +2 nd-order light and the −2nd-order light remains without being eliminated.

As described thus far, as the first effect of the phase contrast reduction process, it is possible to reduce the phase contrast component (the light intensity component caused by the phase difference), and improve the asymmetry of the contrast which depends on the defocus direction (the Z-axis positive direction, the Z-axis negative direction). With this, it is possible to avoid the excessive contrast enhancement in the focus stacking process.

(Second Effect of Phase Contrast Reduction Process)

Further, as the second effect of the phase contrast reduction process, it is possible to retain the three-dimensional structure of an object related to color by separately processing the lightness signal and the color signal (the hue signal, the chroma signal). For example, in the case where different chromatins are included in images with the defocus amounts d=+d and d=−d, the color signal of each chromatin is retained even after the phase contrast reduction process. Accordingly, it is possible to generate image data that is focused on each chromatin by the focus stacking process.

(Phase Contrast Inversion Process)

Figure 17:
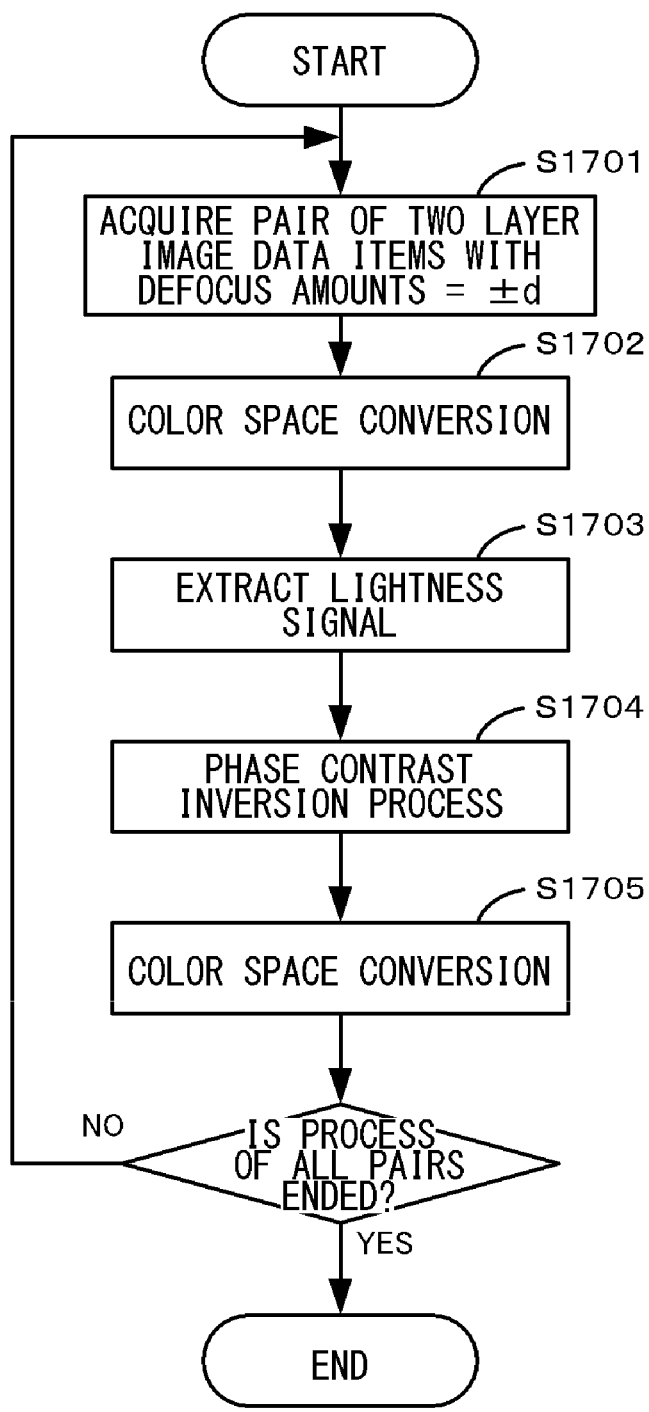
FIG. 17 is a flowchart of a phase contrast inversion process of the first embodiment.

FIG. 17 is a flowchart showing the process flow of the phase contrast inversion process in the first embodiment. Similarly to the description in FIG. 14, it is assumed that the plurality of layer image data items captured while shifting the focus position at a predetermined pitch in each of the positive direction and the negative direction relative to the reference depth (the center of the thickness or the in-focus position) in the specimen are obtained.

Processes from Steps S1701 to Step S1703 are the same as those from Step S1501 to Step S1503 in FIG. 15, and hence the description thereof will be omitted.

In Step S1704, the phase contrast inversion process is performed on the lightness signal (V signal). Hereinbelow, two types of processes of the first phase contrast inversion process and the second phase contrast inversion process will be described, but any of the processes may be performed in Step S1704.

It is assumed that the lightness signals (V signals) of the layer image data items with the defocus amounts d=+d and d=−d are represented by $|u'(x', d_+)|^2$ and $|u'(x', d_-)|^2$, respectively. The first phase contrast inversion process is a process in which each of the lightness signals (V signals) of the layer image data items with the defocus amounts d=±d is represented by the following expression.

$$|u'(x', d_+)|^2$$ [Math. 19]

In addition, the second phase contrast inversion process is a process in which each of the lightness signals (V signals) of the layer image data items with the defocus amounts d=±d is represented by the following expression.

$$|u'(x', d_-)|^2$$ [Math. 20]

That is, the phase contrast inversion process of the present embodiment is a process in which the lightness signal of one of the two layer image data items with the defocus amounts d=±d is replaced with the lightness signal of the other layer image data item. With this, a difference in phase contrast component between the two layer image data items is reduced to be smaller than the original difference.

In Step S1705, from the hue signal (H signal) and the chroma signal (S signal) which are acquired in S1702 and the lightness signal (V signal) after the correction acquired in S1704, the layer image data items (the lightness correction layer image data) with the defocus amounts d=±d are generated. Subsequently, the lightness correction layer image data having the HSV color spaces is converted to the lightness correction layer image data having the RGB color spaces.

In the case of the first phase contrast inversion process, the layer image data item with the defocus amount d=+d is unchanged, and hence it is only necessary to perform the processes in Steps S1704 and S1705 only on the layer image data item with the defocus amount d=−d. Conversely, in the case of the second phase contrast inversion process, it is only necessary to perform the processes in Steps S1704 and S1705 only on the layer image data item with the defocus amount d=+d.

In the case where a plurality of pairs of two layer image data items having the same absolute value of the defocus amount d relative to the reference depth (the in-focus position d=0) are present, the processes from Step S1701 to Step S1705 are performed on all of the pairs.

According to the above process steps, it is possible to generate the plurality of layer image data items in which the phase contrast of one of the two layer image data items is inverted.

(First Effect of Phase Contrast Inversion Process)

Figure 18C:
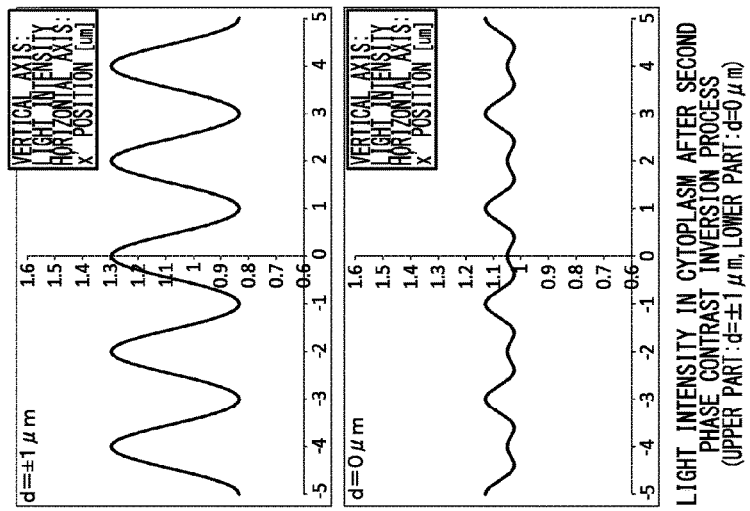
FIGS. 18A to 18C are schematic views for explaining the effect of the phase contrast inversion process of the first embodiment.
Figure 18B:
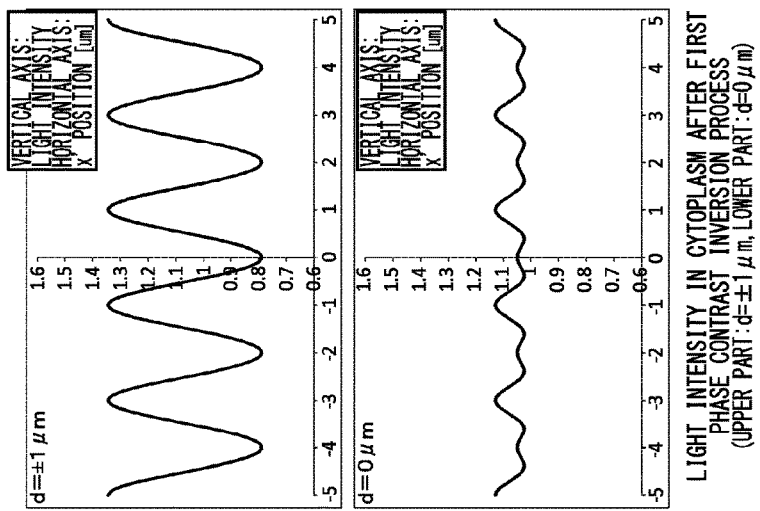
Figure 18A:
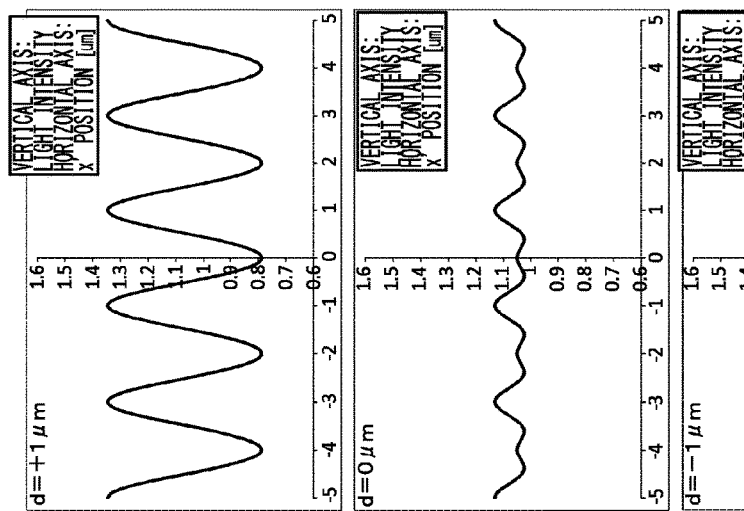

Each of FIGS. 18A to 18C is a schematic view for explaining the effect of the phase contrast inversion process shown in FIG. 17. FIG. 18A shows the light intensity in the complex amplitude distribution model of the cytoplasm 603. Since the effect of the phase contrast inversion process can be significantly seen in a moderately high spatial frequency domain, a description will be given based on the assumption that the spatial frequency of the amplitude change $\mu_1$=0.50 (/μm) and the spatial frequency of the phase change $\mu_2$=0.50 (/μm) are satisfied. The upper part, the middle part, and the lower part of FIG. 18A correspond to the defocus amounts d=+1 (μm), d=0 (μm), and d=−1 (μm), respectively.

In the complex amplitude distribution model of the cytoplasm 603, the light intensity having the inverted contrast is obtained with d=+1 (μm) and d=−1 (μm). The contrast can be scarcely obtained with d=0 (μm). This is similar to the relationship between the positive (dark) contrast and the negative (bright) contrast described in connection with FIG. 7A and FIG. 7C. In addition, when the defocus in the positive Z direction is compared with the defocus in the negative Z direction based on the assumption that the absolute values of the defocus amount d are equal to each other, similarly to FIG. 11D and FIG. 11F, the positive defocus amount tends to have the higher contrast.

FIG. 18B shows the result of execution of the first phase contrast inversion process to the light intensity in the complex amplitude distribution model of the cytoplasm 603. The upper part of FIG. 18B corresponds to the defocus amounts d=+1 (μm) and d=−1 (μm), and the middle part thereof corresponds to d=0 (μm). Each of the light intensities with the defocus amounts d=±1 (μm) is the same as the light intensity with the defocus amount d=+1 (μm) of FIG. 18A, and it can be seen that the contrasts of the two layer image data items are identical with each other.

FIG. 18C shows the result of execution of the second phase contrast inversion process to the light intensity in the complex amplitude distribution model of the cytoplasm 603. The upper part of FIG. 18C corresponds to the defocus amounts d=+1 (μm) and d=−1 (μm), and the middle part thereof corresponds to d=0 (μm). Each of the light intensities with the defocus amounts d=±1 (μm) is the same as the light intensity with the defocus amount d=−1 (μm) of FIG. 18A, and it can be seen that the contrasts of the two layer image data items are identical with each other.

Herein, the physical background in the phase contrast inversion process will be described. The difference image data of the lightness signals (V signals) of the layer image data items with the defocus amounts d=+d and d=−d is represented by the following expression.

[Math. 21]
$$|u'(x', d_+)|^2 - |u'(x', d_-)|^2 = 2 \cdot F_{odd|d}(x', d_+)$$
$$= -2 \cdot F_{odd|d}(x', d_-)$$

Each of $F_{odd|d}(x', d_+)$ and $D_{odd|d}(x', d_-)$ is a term including the phase contrast component, and this means that the term including the phase contrast component can be extracted using the difference image data. In the phase contrast inversion process, the signs of the terms each including the phase contrast component of the lightness signal of the layer image data are caused to match each other. The first phase contrast inversion process to the layer image data with d<0 is represented by the following expression.

[Math. 22]
$$|u'(x', d_-)|^2 + \{|u'(x', d_+)|^2 - |u'(x', d_-)|^2\} = |u'(x', d_+)|^2$$
$$= Const. + F_{odd|d}(x', d_+) + F_{even|d}(x', d_+)$$

The first phase contrast inversion process is a process in which the symmetry of the odd function of the intensity distribution of the specimen (biological sample) with respect to d is eliminated. That is, the first phase contrast inversion process is a process in which the phase contrast of the lightness signal of the layer image data item in the Z-axis negative direction is caused to match the phase contrast of the lightness signal of the layer image data item in the Z-axis positive direction.

Similarly, the second phase contrast inversion process to the layer image data with d>0 is represented by the following expression.

[Math. 23]
$$|u'(x', d_+)|^2 - \{|u'(x', d_+)|^2 - |u'(x', d_-)|^2\} = |u'(x', d_-)|^2$$
$$= Const. - F_{odd|d}(x', d_-) + F_{even|d}(x', d_-)$$

The second phase contrast inversion process is a process in which the symmetry of the odd function of the intensity distribution of the specimen (biological sample) with respect to d is eliminated. That is, the second phase contrast inversion process is a process in which the phase contrast of the lightness signal of the layer image data item in the Z-axis positive direction is caused to match the phase contrast of the lightness signal of the layer image data item in the Z-axis negative direction.

As described thus far, as the first effect of the phase contrast inversion process, it is possible to eliminate the contrast inversion caused by the phase contrast component (the light intensity component caused by the phase difference). As a result, it is possible to improve the asymmetry of the contrast which depends on the defocus direction (the Z-axis positive direction, the Z-axis negative direction).

(Second Effect of Phase Contrast Inversion Process)

Figure 19B:
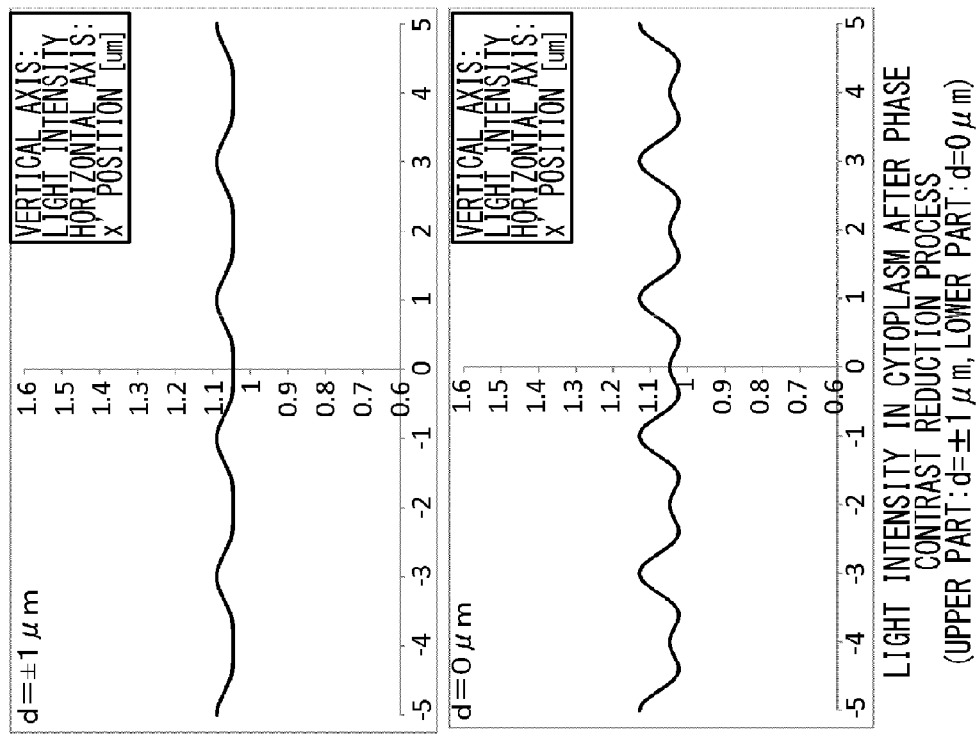
FIGS. 19A and 19B are schematic views for explaining the effect of the phase contrast inversion process of the first embodiment.
Figure 19A:
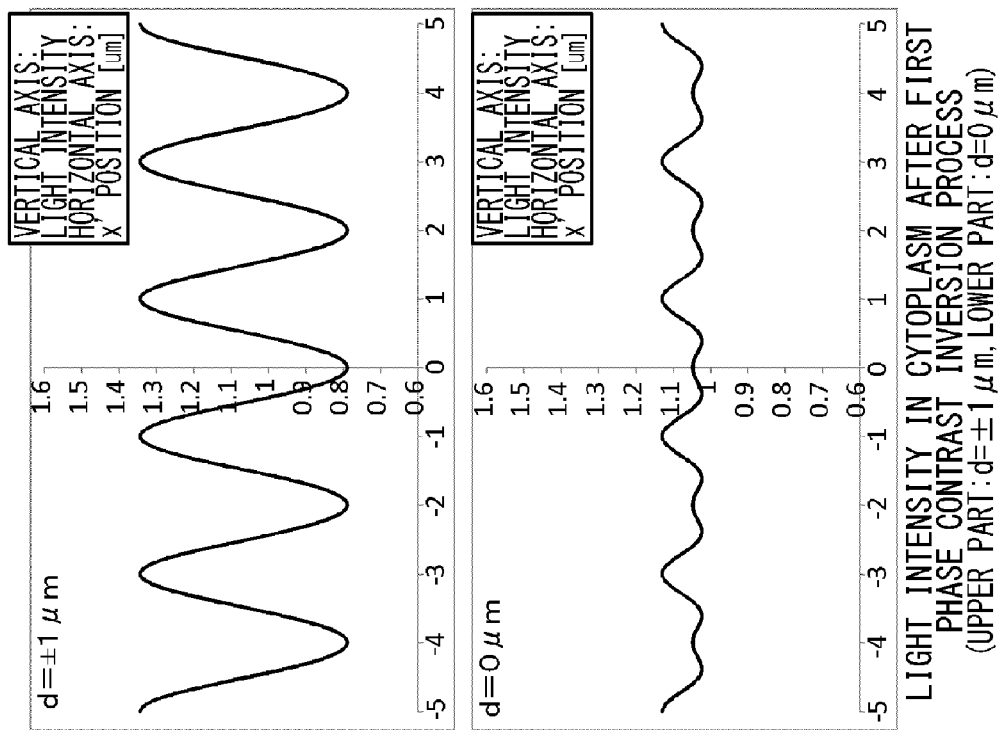

Each of FIG. 19A and FIG. 19B is a schematic view for explaining the effect (retainment of the high spatial frequency component of the phase contrast) of the phase contrast inversion process in the first embodiment. Similarly to FIG. 18A, a description will be given based on the assumption that the spatial frequency of the amplitude change $\mu_1=0.50$ (/μm) and the spatial frequency of the phase change $u_2=0.50$ (/μm) are satisfied. FIG. 19A shows the result of execution of the first phase contrast inversion process to the light intensity in the complex amplitude distribution of the cytoplasm 603, and the result is similar to that in FIG. 18B. FIG. 19B shows the result of execution of the phase contrast reduction process to the light intensity in the complex amplitude distribution model of the cytoplasm 603. As shown in the upper part and the lower part of FIG. 18A, in the case where the phases of d=+1 (μm) and d=−1 (μm) are shifted from each other, when the average thereof is calculated by the phase contrast reduction process, the light intensities cancel each other and, as shown in the upper part of FIG. 19B, the contrast is lost. When the upper part of FIG. 19A is compared with the upper part of FIG. 19B, it can be seen that more phase contrast components are retained in the phase contrast inversion process than in the phase contrast reduction process. As described thus far, as the second effect of the phase contrast inversion process, since the phase contrast component is retained, it is possible to generate the image data including the phase contrast component in the focus stacking process.

(Third Effect of Phase Contrast Inversion Process)

Each of FIGS. 20A to 20C is a schematic view for explaining the effect (compatibility with staining) of the phase contrast inversion process in the first embodiment. Similarly to FIG. 18A and FIG. 19A, a description will be given based on the assumption that the spatial frequency of the amplitude change $\mu_1=0.50$ (/μm) and the spatial frequency of the phase change $\mu_2=0.50$ (/μm) are satisfied. FIG. 20A shows the result of execution of the first phase contrast inversion process to the light intensity in the complex amplitude distribution model of the cytoplasm 603, and is similar to FIG. 18B. FIG. 20B shows the light intensity of an amplitude object (an object of which only the amplitude changes) which simulates the amplitude change amount of the cytoplasm 603. FIG. 20C shows the light intensity of a phase object (an object of which only the phase changes) which simulates the phase change amount of the cytoplasm 603.

When the light intensity with the defocus amounts d=±1 (μm) in the upper part of FIG. 20B is compared with the light intensity with the defocus amount d=+1 (μm) in the upper part of FIG. 20C, it can be seen that the phases are identical with each other. On the other hand, when the light intensity with the defocus amounts d=±1 (μm) in the upper part of FIG. 20B is compared with the light intensity with the defocus amount d=−1 (μm) in the lower part of FIG. 20C, it can be seen that the phase is inverted. This is due to that HE staining is assumed to be used in the complex amplitude distribution model of the cytoplasm 603 and the refractive index in the area in which the organelle coagulates is high. In the light intensity with the defocus amount d=+1 (μm) in the upper part of FIG. 20C, the positive (dark) contrast described in connection with FIG. 7C is obtained. In the light intensity with the defocus amount d=−1 (μm) in the lower part of FIG. 20C, the negative (bright) contrast described in connection with FIG. 7A is obtained. With the defocus in the Z-axis positive direction, since the phase resulting from the amplitude change and the phase resulting from the phase change match each other, the tendency of the light intensity resulting from the amplitude change and the tendency of the light intensity resulting from the phase change match each other, and instinctively natural image data (a bright area is observed as a bright area) is obtained. On the other hand, with the defocus in the Z-axis negative direction, since the phase resulting from the amplitude change is opposite to the phase resulting from the phase change, the tendency of the light intensity resulting from the amplitude change and the tendency of the light intensity resulting from the phase change do not match each other, and instinctively unnatural image data (a bright area is observed as a dark area) is obtained.

Based on the above examination, in the staining method such as HE staining in which an area having a high refractive index is stained, the first phase contrast inversion process is considered to be suitable. In addition, in the staining method in which an area having a low refractive index is stained, the second phase contrast inversion process is considered to be suitable. Consequently, when the phase contrast inversion process is performed in the image processing apparatus, it is appropriate to determine the staining method applied to the specimen, and automatically select one of the first phase contrast inversion process and the second phase contrast inversion process according to the staining method. As the method for determining the staining method, any of a method in which the staining method is estimated by analyzing color distribution of image data, a method in which the staining method is specified by a user, a method in which staining information is recorded in a header or metadata of image data, and a method in which the staining method is recorded in the label area of the slide may be used. As described thus far, as the third effect of the phase contrast inversion process, it is possible to generate the instinctively natural image data in which a bright area is observed as a bright area by performing the phase contrast inversion process suitable for the nature of the staining method.

(Fourth Effect of Phase Contrast Inversion Process)

Further, as the fourth effect of the phase contrast inversion process, it is possible to retain the three-dimensional structure of the object related to color by separately processing the lightness signal and the color signal (the hue signal, the chroma signal). For example, in the case where different chromatins are included in images with the defocus amounts d=+d and d=−d, the color signal of each chromatin is retained even after the phase contrast reduction process. Accordingly, it is possible to generate image data which is focused on each chromatin by the focus stacking process.

The above description have been given by using the one-dimensional space, but the description can be applied to the two-dimensional space (image data) without any alteration. In addition, the description has been given based on the assumption that the amplitude change and the phase change of the specimen (biological sample) are the single spatial frequencies and, since the spatial frequencies of the amplitude change and the phase change of the specimen (biological sample) can be represented by the sum (integral) of a plurality of single spatial frequencies, the above discussion does not lose generality. In addition, the description has been given by using the single wavelength and, since the wavelength of visible light can be represented by the weighted sum (integral) of a plurality of single wavelengths, the above discussion does not lose generality. Further, as the expression which represents the phase change of the specimen (biological sample), the follow expression has been used.

$$P(x)=1+i\cdot b\cdot\cos(2\pi\mu_2 x)(b<<\pi) \qquad \text{[Math. 24]}$$

However, in the case where the phase change is large, by increasing the number of (imaginary) terms of the expansion expression of the phase change, the phase change can be represented by the following expression.

$$P(x) = 1 + i \cdot b \cdot \cos(2\pi\mu_2 x) - \qquad \text{[Math. 25]}$$
$$\frac{1}{2!} \cdot (b \cdot \cos(2\pi\mu_2 x))^2 - i \cdot \frac{1}{3!} \cdot (b \cdot \cos(2\pi\mu_2 x))^3 + \ldots$$

With this, the number of diffraction images shown in FIG. 10A and FIG. 10B is increased, but the discussion related to the phase contrast reduction process and the phase contrast inversion process can be used without being altered. That is, also in the case where the phase change of the specimen (biological sample) is large, the present invention can be applied.

In addition, in the description of the physical background, it has been assumed that each of the nucleus 602 and the cytoplasm 603 is present at the Z position of the center of the thickness of the specimen (biological sample) 501. In the case where it is considered that the nucleus 602 or the cytoplasm 603 is distributed so as to have an even structure in the Z-axis direction in consideration of the thickness of the specimen (biological sample) 501, although an influence such as a reduction in contrast or the like occurs, the discussion related to the phase contrast reduction process and the phase contrast inversion process can be applied. In the present invention, since the focus stacking process is assumed to be used, the present invention provides a method which is more effective in the case where the chromatin in the nucleus 602 has the three-dimensional structure (different chromatins are included in images with the defocus amounts d=+d and d=−d). In this case, it is appropriate to consider that the light intensities of the nucleus shown in FIGS. 11A to 11C and FIG. 16A are maximized with d=+d instead of d=0.

Modification of First Embodiment

In the first embodiment, the method in which the phase contrast reduction/inversion process is performed on the lightness signal of the layer image data has been described, but a mode in which the above process is performed on each color plane (an R plane, a G plane, and a B plane in the case of RGB image data) is conceivable. The operation of performing the phase contrast reduction process on each color plane corresponds to the operation of replacing two layer image data items with d=±d with their average image data item. In addition, the operation of performing the first phase contrast inversion process on each color plane corresponds to the operation of replacing the layer mage data item with d=−d with the layer image data item with d=+d. The operation of performing the second phase contrast inversion process on each color plane corresponds to the operation of replacing the layer image data item with d=+d with the layer image data item with d=−d. With any of the processes, two layer image data items after the correction are identical with each other.

Second Embodiment

In the first embodiment, the method in which the process is performed on the entire XY area of the layer image data has been described. In a second embodiment, a method in which the XY area of the layer image data is processed after the XY area is divided into the area of the nucleus and the area of the cytoplasm will be described.

As described in connection with FIGS. 9A to 9B, FIGS. 10A to 10B, and FIGS. 11A to 11F, the area of the nucleus and the area of the cytoplasm form different images, and have different characteristics of the light intensity in the Z-axis direction. Specifically, the amplitude change of transmitted light is large in the area of the nucleus, and hence the influence of the phase contrast is inconspicuous. On the other hand, the transmittance is high in the area of the cytoplasm, and hence the amplitude change is small and the influence of the phase contrast is conspicuously seen. That is, the influence of the phase contrast is not a problem in the entire area of the layer image data, but becomes conspicuous in the area of the cytoplasm having characteristics similar to those of the phase object (an area having the same or similar characteristics as or to those of the phase object in which the influence of the phase contrast is conspicuously seen is referred to as a "phase object area"). To cope with this, in the present embodiment, the layer image data is divided into the phase object area (the area of the cytoplasm) and the area other than the phase object area (the area of the nucleus), and the phase contrast reduction/inversion process is performed only on the phase object area. With this, it is possible to retain the three-dimensional structure of the nucleus (chromatin) related to lightness and color while reducing the artifact caused by the phase contrast. That is, in the second embodiment, it is possible to obtain an effect which strengthens the second effect of the phase contrast reduction process and the fourth effect of the phase contrast inversion process of the first embodiment. The processes from FIG. 1 to FIG. 14 are the same as those in the first embodiment, and hence the description thereof will be omitted.

(Focus Stacking Image Data Generation Process in Second Embodiment)

Figure 21:
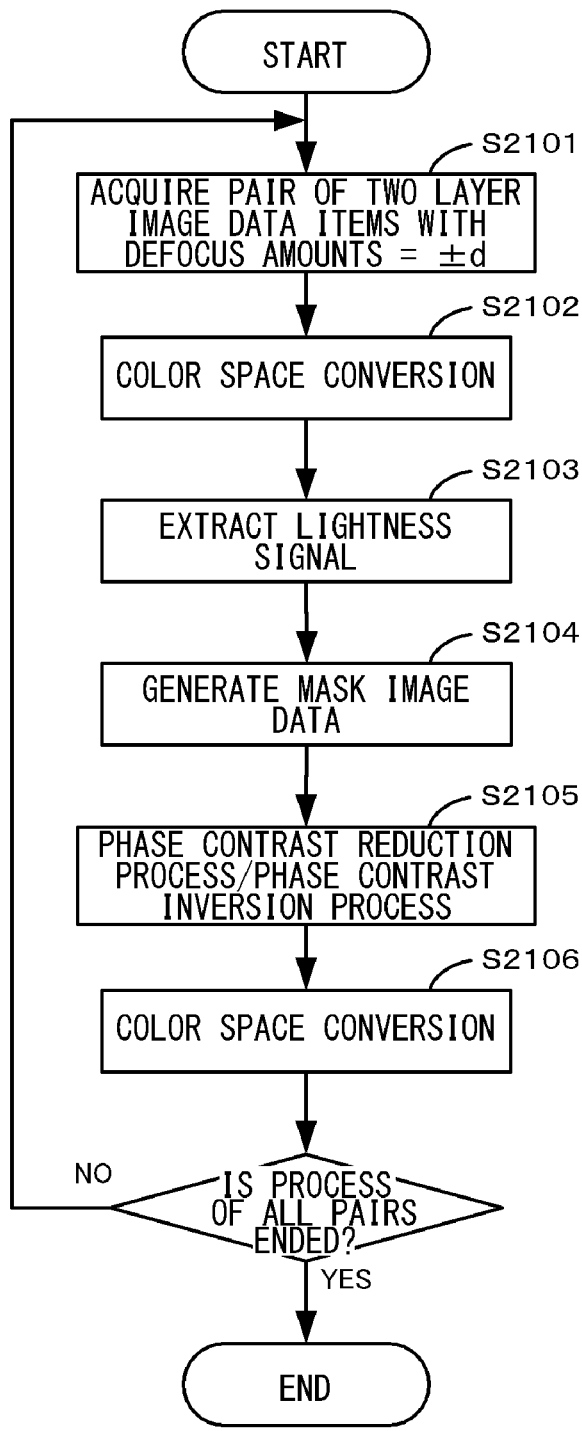
FIG. 21 is a flowchart of the phase contrast inversion/reduction process of a second embodiment.

FIG. 21 is a flowchart showing the process flows of the phase contrast reduction process and the phase contrast inversion process in the second embodiment. Similarly to the description in FIG. 14, it is assumed that the plurality of layer image data items captured while shifting the focus position at a predetermined pitch in each of the positive direction and the negative direction relative to the reference depth (the center of the thickness or the in-focus position) in the specimen are obtained.

Processes from Step S2101 to Step S2103 are the same as those from Step S1501 to Step S1503 in FIG. 15, and hence the description thereof will be omitted.

In Step S2104, mask image data is generated by using the lightness signal (V signal) acquired in S2103. The mask image data is generated by performing a thresholding process on the difference image data of the lightness signals (V signals) of the layer image data items with the defocus amounts d=+d and d=−d. The difference image data can be represented by the following expression.

$$|u'(x', d_+)|^2 - |u'(x', d_-)|^2 = F_{odd|d}(x', d_+) - F_{odd|d}(x', d_-) \qquad \text{[Math. 26]}$$
$$= 2 \cdot F_{odd|d}(x', d_+)$$
$$= -2 \cdot F_{odd|d}(x', d_-)$$

The difference image data is image data in which the phase contrast component is doubled. As described in connection with FIGS. 10A to 10B and FIGS. 11A to 11F, since the influence of the phase contrast (the influence of the phase change) is larger in the cytoplasm 603 than in the nucleus 602, it is possible to extract the area of the cytoplasm 603. The mask image data is image data in which the area other than the area of the cytoplasm 603 (the phase object area) is masked. Note that the threshold value may be empirically determined by using a plurality of sample image data items, or may also be dynamically (adaptively) determined in accordance with the lightness distribution of the layer image data to be processed or the difference image data.

In Step S2105, the phase contrast reduction process or the phase contrast inversion process is performed on the mask image data acquired in S2104. The phase contrast reduction process and the phase contrast inversion process are the same as those described in connection with FIGS. 15 to 19B, and hence the description thereof will be omitted.

The process in Step S2106 is the same as the process in Step S1505 in FIG. 15 or Step S1705 in FIG. 17.

In the case where a plurality of pairs of two layer image data items having the same absolute value of the defocus amount d relative to the reference depth (the in-focus position d=0) are present in the original Z-stack image data, the processes from Step S2101 to Step S2106 are performed on all of the pairs.

According to the above process steps, it is possible to generate the plurality of layer image data items which include the pair of the two layer image data items of which the phase contrasts are reduced or of which one has the inverted phase contrast.

As described thus far, as the effect of the phase contrast reduction process, it is possible to reduce the phase contrast component (the light intensity component caused by the phase difference), and improve the asymmetry of the contrast which depends on the defocus direction (the Z-axis positive direction, the Z-axis negative direction). With this, it is possible to avoid the excessive contrast enhancement in the focus stacking process. In addition, as the effect of the phase contrast inversion process, it is possible to eliminate the contrast inversion caused by the phase contrast component (the light intensity component caused by the phase difference), and improve the asymmetry of the contrast which depends on the defocus direction (the Z-axis positive direction, the Z-axis negative direction).

In addition, it is possible to retain the three-dimensional structure of the object related to lightness and color. For example, in the case where different chromatins are included in images with the defocus amounts d=+d and d=−d, the lightness signal and the color signal of each chromatin are retained even after the phase contrast reduction process. Accordingly, it is possible to generate image data which is focused on each chromatin by the focus stacking process.

Modification of Second Embodiment

The phase contrast reduction/inversion process is performed on the lightness signal of the area of the cytoplasm 603 in the second embodiment, but a mode in which the above process is performed on each color plane (the R plane, the G plane, and the B plane in the case of the RGB image data) of the area of the cytoplasm 603 is conceivable.

Third Embodiment

In the second embodiment, the process which performs the extraction of the phase object area (the area of the cytoplasm) for each pair of the layer image data items has been described. In a third embodiment, a description will be given of a simple method in which the phase object area (the area of the cytoplasm) is extracted from a representative layer image data item selected from the plurality of layer image data items and the phase object area is used in the phase contrast correction process for all of the layer image data items.

As described in connection with FIGS. 9A to 9B, FIGS. 10A to 10B, and FIGS. 11A to 11F, the area of the nucleus and the area of the cytoplasm form different images, and have different characteristics of the light intensity in the Z-axis direction. Accordingly, even when the layer image data is processed after the layer image data is divided into the area of the nucleus and the area of the cytoplasm, the same effect as that of the first embodiment can be obtained. The processes from FIG. 1 to FIG. 13B are the same as those in the first embodiment, and hence the description thereof will be omitted.

(Focus Stacking Image Data Generation Process in Third Embodiment)

Figure 22:
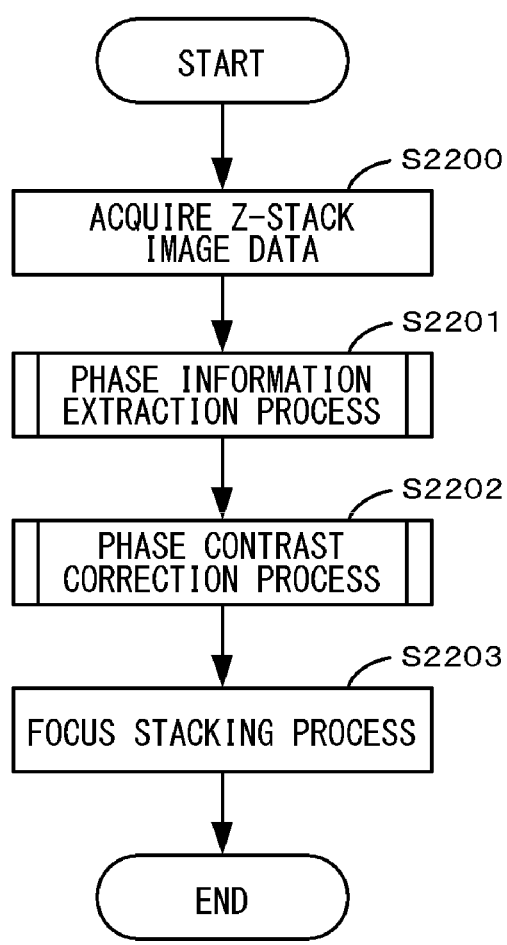
FIG. 22 is a flowchart of the two-dimensional focus stacking image data generation process of a third embodiment.

FIG. 22 is a flowchart showing the overall flow of the two-dimensional focus stacking image data generation process in the third embodiment.

In Step S2200, the Z-stack image data on the specimen is acquired from the storage device 408 or the data server 104. Similarly to the description in FIG. 14, it is assumed that the plurality of layer image data items captured while shifting the focus position at a predetermined pitch in each of the positive direction and the negative direction relative to the reference depth (the center of the thickness or the in-focus position) in the specimen are obtained.

In Step S2201, a phase information extraction process is performed. The phase information extraction process will be described in connection with FIG. 23. By the phase information extraction process, the mask image data to the area of the cytoplasm is generated.

The process in Step S2202 is basically the same as the process in Step S1401 in FIG. 14, and, similarly, it is possible to use the phase contrast reduction process (FIG. 15) and the first or second phase contrast inversion process (FIG. 17). However, the process in Step S2202 is different from the process in Step S1401 only in that the phase contrast reduction/inversion process is performed only on the area of the cytoplasm by using the mask image data generated in Step S2201. The process which uses the mask image data is the same as that in the second embodiment, and hence the description thereof will be omitted.

In Step S2203, the focus stacking process is performed. The focus stacking process is the same as the process described in connection with FIG. 13A.

According to the above process steps, it is possible to execute the focus stacking image data generation process which reduces the excessive contrast enhancement.

(Phase Information Extraction Process in Third Embodiment)

Figure 23A:
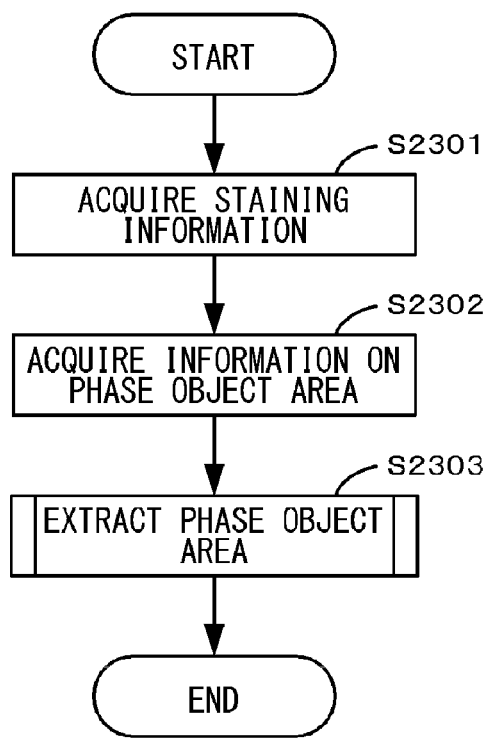
FIGS. 23A and 23B are flowcharts of a phase information extraction process of the third embodiment.
Figure 23B:
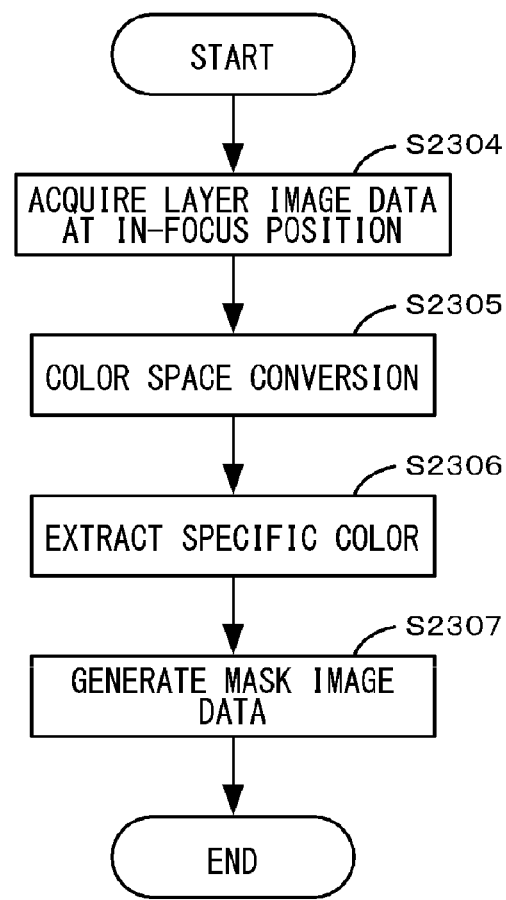

FIG. 23A is a flowchart showing the process flow of a first phase information extraction process in the third embodiment.

In Step S2301, staining information is acquired. The staining information is information for determining the staining method (e.g., HE staining, Masson's trichrome staining, or the like). For example, in the case where the staining information is recorded in the label area 504 as the bar code or the two-dimensional code, it is possible to acquire the staining information on the specimen (biological sample) 501 by reading it. As the other methods, it is also possible to adopt a method in which the staining method is estimated by analyzing the color distribution of the image data, a method in which the staining method is specified by the user, and a method in which the staining information is recorded in the header or the metadata of the image data.

In Step S2302, information on the phase object area is acquired. In the case of HE staining, as described in connection with FIG. 9B and FIGS. 11D to 11F, the eosin-stained area is the area in which the phase contrast characteristic is conspicuously displayed. The phase object area is the area in which the phase contrast characteristic is conspicuously displayed. In the phase object area, the brightness of the layer image data at the time of the defocus from the in-focus position in the positive direction (d>0) is inverted from that at the time of the defocus from the in-focus position in the negative direction (d<0), due to the influence of the phase contrast. The information on the phase object area corresponds to color conditions (the ranges of the hue and the chroma) of the area in which the phase contrast characteristic is conspicuously displayed. In the case of HE staining, the information on the phase object area corresponds to the color conditions indicative of the ranges of the hue and the chroma of the eosin color (pale red color). For example, a table in which the staining method and the information (color condition) on the phase object area are associated with each other may be prepared in the storage device in advance, and the color condition corresponding to the staining method determined in Step S2301 may be appropriately read from the table.

In Step S2303, the phase object area is extracted. The process flow of a phase object area extraction process will be described in connection with FIG. 23B.

In Step S2304, the representative layer image data used for the extraction of the phase object area is acquired. In the present embodiment, the layer image data at the in-focus position (d=0) is used.

In Step S2305, the color space conversion is performed on the layer image data at the in-focus position (d=0). The layer image data having the RGB color spaces is converted to the layer image data having the HSV color spaces. The HSV color spaces are color spaces including the hue (h), the chroma (S), and the lightness (V).

In Step S2306, an area (pixel group) which corresponds to the color conditions (the ranges of H (hue) and S (chroma) of eosin in the case of HE staining) acquired in S2302 is extracted from the HS color spaces of the HSV color spaces acquired in S2305.

In Step S2307, the mask image data which masks an area other than the area (pixel group) extracted in S2306 is generated. In the case of HE staining, the mask image data in which the area other than the eosin-stained area is masked is obtained.

According to the above process steps, it is possible to execute the extraction process of the area in which the phase contrast characteristic is conspicuously displayed. In addition, the phase contrast reduction/inversion process in Step S2202 in FIG. 22 is performed on each layer image data by using the mask image data obtained herein, and it is thereby possible to reduce the influence of the phase contrast in the area having a high probability of being the cytoplasm.

As described thus far, as the effect of the phase contrast reduction process, it is possible to reduce the phase contrast component (the light intensity component caused by the phase difference), and improve the asymmetry of the contrast which depends on the defocus direction (the Z-axis positive direction, the Z-axis negative direction). With this, it is possible to avoid the excessive contrast enhancement in the focus stacking process. In addition, as the effect of the phase contrast inversion process, it is possible to eliminate the contrast inversion caused by the phase contrast component (the light intensity component caused by the phase difference), and improve the asymmetry of the contrast which depends on the defocus direction (the Z-axis positive direction, the Z-axis negative direction).

In addition, in the present embodiment, the mask image data is generated by using one representative layer image data item and the mask image data is used for the phase contrast reduction/inversion process of all of the layer image data items, and hence it is possible to achieve an increase in the speed of the process as compared with the method in the second embodiment. In the present embodiment, the layer image data at the in-focus position (d=0) has been used as the representative layer image data, but any layer image data may be used as the representative layer image data.

Fourth Embodiment

In the third embodiment, the simple method in which the mask image data generated from the representative layer image data is used for the correction of all of the layer image data items has been described. In a fourth embodiment, a description will be given of a simpler method in which, with emphasis placed on the focus stacking of the area of the nucleus, the focus stacking is performed first, and the phase contrast correction is performed on the phase object area in the focus stacking image data.

As described in connection with FIGS. 9A to 9B, FIGS. 10A to 10B, and FIGS. 11A to 11F, the area of the nucleus and the area of the cytoplasm form different images and have different characteristics of the light intensity in the Z-axis direction. Accordingly, even when the layer image data is processed after the layer image data is divided into the area of the nucleus and the area of the cytoplasm, the same effect as that of the first embodiment can be obtained. The processes from FIG. 1 to FIG. 13B are the same as those in the first embodiment, and hence the description thereof will be omitted.

FIG. 24A is a flowchart showing the overall flow of a second two-dimensional focus stacking image data generation process in the fourth embodiment.

In Step S2400, the Z-stack image data on the specimen is acquired from the storage device 408 or the data server 104. Similarly to the description in FIG. 14, it is assumed that the plurality of layer image data items captured while shifting the focus position at a predetermined pitch in each of the positive direction and the negative direction relative to the reference depth (the center of the thickness or the in-focus position) in the specimen are obtained.

In Step S2401, the phase information extraction process is performed, and the mask image data of the phase object area is obtained. As the phase information extraction process, it is possible to use the process described in connection with FIG. 23A and FIG. 23B.

In Step S2402, the focus stacking process is performed. The focus stacking process is the same as the process described in connection with FIG. 13A. With this, the focus stacking image data is obtained.

In Step S2403, the phase contrast correction process is performed. The phase contrast correction process will be described in connection with FIG. 24B.

In Step S2404, the representative layer image data used for the phase contrast correction is acquired. In the present embodiment, the layer image data at the in-focus position (d=0) is used.

In Step S2405, the data on the area (the eosin-stained area in HE staining) in which the phase contrast characteristic is conspicuously displayed of the focus stacking image data is replaced with data in the layer image data at the in-focus position (d=0) by using the mask image data generated in S2401.

According to the above process steps, it is possible to execute the focus stacking image data generation process which reduces the excessive contrast enhancement.

Other Embodiments

The preferred embodiments of the present invention have been described thus far, but these embodiments are only specific examples of the present invention, and the scope of the present invention is not limited to the specific examples.

For example, in the above embodiments, the center of the thickness of the specimen is assumed to be the in-focus position, and the correction of the phase contrast has been performed with the center of the thickness of the specimen used as the reference depth. However, the method of determining the in-focus position and the reference depth is not limited thereto. By the autofocus process by the pre-measurement unit 320 or the imaging unit 310, the focus position with which the specimen is in focus most sharply (e.g., the position with which the layer image data having the highest contrast can be obtained) is used as the in-focus position, and the in-focus position may be used as the reference depth (d=0). Alternatively, among the plurality of layer image data items obtained from the imaging device 101, the layer image data item at the Z position at the center may be simply considered as the layer image data item at the reference depth (d=0).

In the first to third embodiments, the focus stacking image data has been generated by using the Z-stack image data after the correction, but the generation of the focus stacking image data is not essential. For example, there are cases where hoisting and lowering operations of the focus position in an optical microscope are simulated by, e.g., successively switching the layer image data displayed on the display device, and the three-dimensional structure of an object is thereby grasped. In such cases, when the Z-stack image data after the correction is used in the display, it is possible to suppress the occurrence of brightness change caused by the phase contrast when the layer image data is switched, and hence it becomes possible to perform proper object observation.

In the second to fourth embodiments, the process applied to the area of the nucleus is different from the process applied to the area of the cytoplasm. In the case where the artifact occurs at the boundary between the area of the nucleus and the area of the cytoplasm due to the change of the process, the artifact may be reduced by blending two process results in the vicinity of the boundary. For example, the reduction in artifact can be implemented by using multi-valued mask image data in which a coefficient (blend ratio) of 0.0 to 1.0 is defined as the mask image data instead of binary image data, and smoothly changing the coefficient in the vicinity of the boundary between the nucleus and the cytoplasm.

In the second to fourth embodiments, the phase object area (the area in which the influence of the phase contrast is conspicuously seen) is extracted based on the staining information, and the phase contrast correction is performed only on the phase object area. However, the method of extracting the phase object area is not limited thereto. For example, by evaluating the lightness component and the chroma component in the image data, an area which satisfies a color condition that the lightness is higher than a predetermined value and the chroma is lower than a predetermined value (i.e., an almost colorless and transparent area) may be extracted as the phase object area. According to such a method, it is possible to determine the area on which the phase contrast correction is to be performed without the staining information.

In the fourth embodiment, a part of the focus stacking image data (the phase object area) has been replaced with data in the representative layer image data, but the focus stacking data in the phase object area and the representative layer image data may be subjected to weighting synthesis (blend) instead of the replacement. In addition, by performing the replacement or blend of the phase object area by using the layer image data at a position other than the in-focus portion as the representative layer image data, the similar effect can be obtained.

In addition, in the fourth embodiment, the mask image data has been generated by using the representative layer image data, but the order of execution of Step S2401 and Step 2402 may be reversed, and the mask image data may be generated by using the focus stacking image data.

In the above embodiments, the HSV color spaces have been used in order to extract the lightness component of the image data, but other color spaces such as a CIE-Lab color space and the like may also be used.

In the above embodiments, the pathology specimen has be used as the example, but the present invention can be preferably applied to any specimen as long as the specimen includes an area which displays characteristics as the phase object or the weak phase object.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-81236, filed on Apr. 10, 2014, which is hereby incorporated by reference herein in its entirety.

REFERENCE SIGNS LIST

101: imaging device 102: image processing apparatus

The invention claimed is:

1. An image processing system comprising:
an imaging device which acquires a plurality of layer image data items by capturing images with focus positions set at different depths in a specimen; and
an image processing apparatus comprising one or more processors and/or one or more circuits, the one or more processors and/or one or more circuits being used to provide units comprising:
(1) a selection unit for selecting at least one pair of two layer image data items having focus positions shifted oppositely, by equal distances, in a positive direction and a negative direction relative to a reference depth in the specimen from among the plurality of layer image data items acquired with the focus positions set at different depths in the specimen; and
(2) a phase contrast correction unit for performing, for each of the at least one pair of the two layer image data items selected by the selection unit, a correction process which reduces a difference in phase contrast component between the two layer image data items,
wherein the correction process is a process in which lightness signals of the two layer image data items are replaced with a value calculated from the lightness signals of the two layer image data items.

2. The image processing system according to claim 1, wherein the one or more processors and/or one or more circuits are further used to provide a focus stacking unit for generating one focus stacking image data by performing focus stacking on the two layer image data items subjected to the correction process.

3. The image processing system according to claim 1, wherein the correction process is a process in which lightness signals of the two layer image data items are replaced with an average value of the lightness signals of the two layer image data items.

4. The image processing system according to claim 1, wherein the correction process is a process in which the two layer image data items are replaced with an average image data item of the two layer image data items.

5. The image processing system according to claim 1, wherein the correction process is a process in which a lightness signal of one of the two layer image data items is replaced with a lightness signal of the other layer image data item.

6. The image processing system according to claim 1, wherein the correction process is a process in which one of the two layer image data items is replaced with the other layer image data item.

7. The image processing system according to claim 1, wherein the phase contrast correction unit divides the layer image data item to be processed into a phase object area and an area other than the phase object area, and performs the correction process only on the phase object area.

8. The image processing system according to claim 7, wherein the phase contrast correction unit determines an area in which a difference between lightness signals of the two layer image data items is larger than a threshold value, as the phase object area.

9. The image processing system according to claim 7, wherein the phase contrast correction unit extracts the phase object area from one representative layer image data item selected from the plurality of layer image data items, and uses the phase object area extracted from the representative layer image data item for the correction process of all of the layer image data items.

10. The image processing system according to claim 9, wherein the phase contrast correction unit extracts, as the phase object area, an area which satisfies a predetermined color condition from the representative layer image data item.

11. The image processing system according to claim 10, wherein the phase contrast correction unit determines the predetermined color condition based on a staining method performed on the specimen.

12. The image processing system according to claim 7, wherein the phase object area is an area in which the brightness of the layer image data item when the focus position is shifted in the positive direction from the reference depth is inverted from the brightness of the layer image data item when the focus position is shifted in the negative direction from the reference depth.

13. The image processing system according to claim 7, wherein the specimen is a specimen including a plurality of cells, and
wherein the phase object area is an area of cytoplasm.

14. The image processing system according to claim 1, wherein the reference depth is a center of a thickness of the specimen or the focus position with which the specimen is in focus most sharply.

15. An image processing system comprising:
an imaging device which acquires a plurality of layer image data items by capturing images with focus positions set at different depths in a specimen; and
an image processing apparatus comprising one or more processors and/or one or more circuits, the one or more processors and/or one or more circuits being used to provide units comprising:
(1) a focus stacking unit for generating a focus stacking image data item by performing focus stacking on the plurality of layer image data items acquired with focus positions set at different depths in the specimen;
(2) an acquisition unit for acquiring one representative layer image data item from the plurality of layer image data items; and
(3) a phase contrast correction unit for dividing the focus stacking image data item into a phase object area and an area other than the phase object area, and correcting data in the phase object area by using the representative layer image data item.

16. The image processing system according to claim 15, wherein the phase contrast correction unit replaces the data in the phase object area of the focus stacking image data item with data in the representative layer image data item.

17. An image processing method comprising the steps of:
causing a computer to acquire a plurality of layer image data items by capturing images with focus positions set at different depths in a specimen;
causing a computer to select at least one pair of two layer image data items having focus positions shifted oppositely, by equal distances, in a positive direction and a negative direction relative to a reference depth in the specimen from among the plurality of layer image data items acquired with the focus positions set at different depths in the specimen; and
causing the computer to perform, for each of the selected at least one pair of the two layer image data items, a correction process which reduces a difference in phase contrast component between the two layer image data items, wherein the correction process is a process in which lightness signals of the two layer image data items are replaced with a value calculated from the lightness signals of the two layer image data items.

18. A non-transitory computer-readable storage medium storing a program that causes a computer to execute the respective steps of the image processing method according to claim 17.

* * * * *